US010851929B2

(12) United States Patent
Tiberghien et al.

(10) Patent No.: US 10,851,929 B2
(45) Date of Patent: Dec. 1, 2020

(54) FLUID COUPLING

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Romain Mayer, Hery sur Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 16/437,176

(22) Filed: Jun. 11, 2019

(65) Prior Publication Data

US 2019/0383433 A1  Dec. 19, 2019

(30) Foreign Application Priority Data

Jun. 15, 2018  (FR) ..................................... 18 55267

(51) Int. Cl.
*F16L 37/40* (2006.01)
*F16L 37/34* (2006.01)
*F16L 37/407* (2006.01)

(52) U.S. Cl.
CPC ............... *F16L 37/40* (2013.01); *F16L 37/34* (2013.01); *F16L 37/407* (2013.01)

(58) Field of Classification Search
CPC . F16L 37/28; F16L 37/30; F16L 37/32; F16L 37/33; F16L 37/40; F16L 37/407
USPC ...................................... 137/614.03–614.05
See application file for complete search history.

(56) References Cited

U.S. PATENT DOCUMENTS

| 3,498,324 A | 3/1970 | Breuning |
| 3,570,543 A | 3/1971 | Ekman |
| 4,896,697 A * | 1/1990 | Stromdahl .............. F16L 37/23 137/614 |
| 8,973,896 B2 * | 3/2015 | Tiberghien et al. .... F16K 17/00 137/614.03 |
| 10,094,502 B2 * | 10/2018 | Tiberghien et al. .... F16L 37/23 |
| 2015/0267850 A1 * | 9/2015 | Nowack et al. ........ F16L 37/32 251/149.6 |

FOREIGN PATENT DOCUMENTS

GB          2310471 A       8/1997

OTHER PUBLICATIONS

Search Report from related French patent application No. 1855267, completed Mar. 8, 2019.

* cited by examiner

*Primary Examiner* — Kevin L Lee

(57) ABSTRACT

The invention relates to a fluid coupling having coupling elements, each coupling element respectively having: a body, a main valve, movable to open and close a main passage through the body, a safety valve, movable to open and close a secondary passage through the main valve, and a plunger for moving the safety valve. To reduce leaks and reduce the pairing force, the fluid coupling is configured so that, during a pairing of the coupling elements, a sealing gasket cooperates with the body before the safety valves of the two coupling elements are moved toward their open position, and at least one of the plungers pushes its main valve back toward its open position, once the associated safety valve is in the open position.

15 Claims, 10 Drawing Sheets

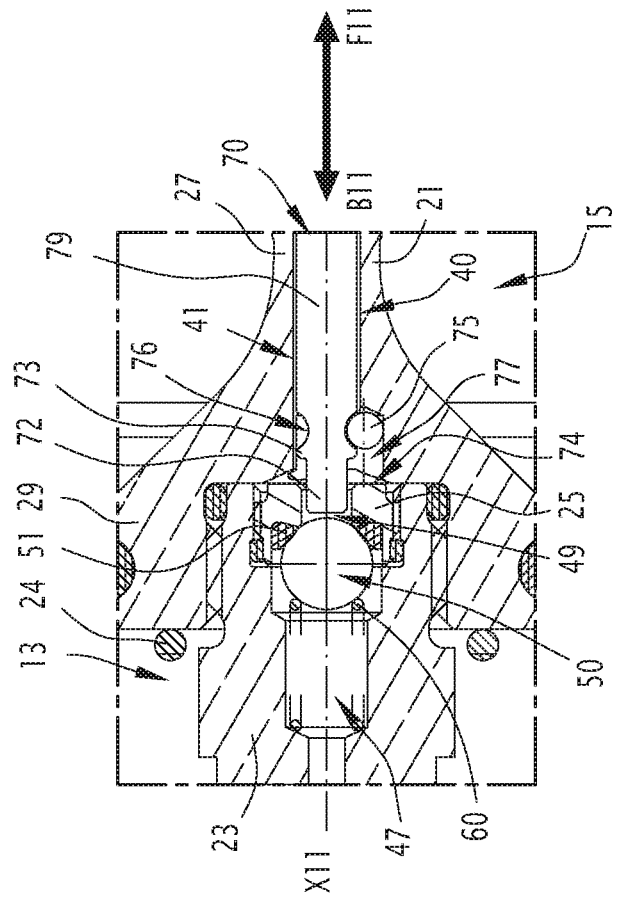
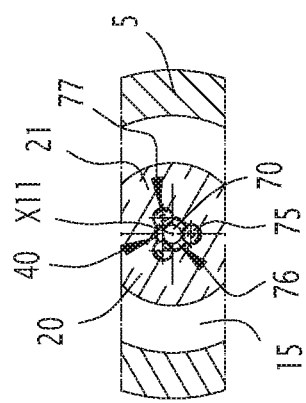
FIG.3
FIG.2

FLUID COUPLING

CROSS-REFERENCE TO RELATED APPLICATIONS

The present application claims priority to French patent application no. 1855267, filed on Jun. 15, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

The present invention relates to a fluid coupling.

The present invention relates to the technical field of couplings for fluid pipes, preferably of the "quick coupling" type, in particular for pressurized liquids.

The coupling elements of the field of the invention allow an easy and quick tight connection for the transport of a fluid. Two coupling elements of a complementary type, for example a male type and a female type, are suitable for being paired in order to couple two systems, such as lines, reservoirs, or machines. In practice, each coupling element includes a body that delimits an inner pipe for the passage of a fluid. More particularly, the invention is applicable to couple a cooling system, in particular for electronic equipment. One of the coupling elements is connected to a pressurized fluid pipe located upstream. In the case of the aforementioned cooling system, the coupling element most often conducts or contains, as fluid, a coolant, for example water optionally comprising an additive, which may reach a pressure of about 20 bars in the unpaired configuration of the coupling element. This pressure level causes a high pairing force of the coupling elements, which is difficult to achieve manually.

U.S. Pat. No. 3,498,324 describes a quick coupler, comprising two elements, one comprising a female body for receiving a male body of the other element, each body being passed through by a main fluid passage. In its respective main passage, each element comprises a main valve. Relative to the body of the element in question, the main valve moves between a closed position, toward the front of the element, in which the main valve closes off the main passage, and an open position, toward the rear, in which the main valve allows the passage of the fluid through the main passage. A spring continuously returns the main valve toward the closed position. Each main valve defines a secondary passage within which a secondary valve is housed. Relative to the associated main valve, the secondary valve also moves between a closed position, toward the front, in which the secondary valve closes off the secondary passage, and an open position, toward the rear, in which the secondary valve allows the passage of the fluid through the secondary passage. Another spring continuously returns the secondary valve to the closed position. Each secondary valve has a portion that, in the closed position of the secondary valve, slightly protrudes from the end of the secondary passage into the main valve, in the forward direction.

However, in this known coupling, the tightness between the male and female bodies is only provided during coupling after the opening of the secondary valves, such that a leak of the pressurized fluid necessarily occurs, temporarily, during the passage between the unpaired configuration and the paired configuration, with an aim of decreasing the pressure to facilitate the coupling. This leak can be detrimental, in particular in the case where one wishes to connect a network of electrically conductive liquid, such as a coolant, in an environment where electrical equipment is present.

Furthermore, in this known coupling, the main valves are opened by placing their respective front ends in contact during pairing, such that the main valves mutually push one another toward the rear, into their open position. Thus, during the pairing, the fluid communication between, on the one hand, the secondary passages and, on the other hand, the intermediate volume defined by the fitted male and female bodies, is obstructed by the placement in contact of the respective ends of the main valves. The decrease of the pressure is therefore limited once the ends of the main valves come into contact. The pressure remaining relatively high, it generates forces tending to oppose the pairing of the coupling.

The invention seeks to resolve in particular the aforementioned drawbacks of the prior art, by proposing a new fluid coupling whereof the leaks upon pairing and the pairing force are reduced, even in case of high pressure in one of the coupling elements.

BRIEF SUMMARY OF THE INVENTION

The invention relates to a fluid coupling, comprising a male coupling element and a female coupling element, each coupling element respectively comprising:
- a body, defining, along a longitudinal central axis, an inner pipe comprising a front volume, emerging at the front of the body, and a rear chamber,
- a main valve, movable in the body between an open position, in which a main passage is open between the main valve and the body, for the passage of the fluid between the rear chamber and the front volume, and a closed position, in which a closing part of the main valve is abutting forwardly against the body and closes the main passage,
- a main spring, which returns the main valve toward its closed position,
- a safety valve, movable relative to the main valve between a closed position and an open position of a secondary passage, arranged through the main valve, between the rear chamber and the front volume,
- a secondary spring, which bears on the safety valve and on the main valve and which returns the safety valve toward its closed position abutting forwardly against the main valve, and
- a plunger, movable in the main valve between a forward configuration, in which the safety valve is in the closed position, and a retracted configuration, in which the plunger moves the safety valve into the open position, the fluid coupling being configured to move between:
an unpaired configuration, in which the bodies of the male and female coupling elements are separated from one another and the main and safety valves of the two coupling elements are in the closed position, and
a paired configuration, in which the front volume of the female coupling element receives a front part of the body of the male coupling element by fitting and the main valves are in the open position.

One from among the male coupling element and the female coupling element comprises at least one sealing gasket that cooperates with the body of the female coupling element and with the body of the male coupling element in the paired configuration.

During a passage from the unpaired configuration to the paired configuration, the plungers come axially into contact against one another and each plunger moves the associated safety valve into the open position, while the associated main valve is in the closed position.

According to the invention, the fluid coupling is configured so that, during a passage from the unpaired configuration to the paired configuration:
said at least one sealing gasket cooperates with the body of the female coupling element and with the body of the male coupling element, before the safety valves of the two coupling elements are moved toward their open position, and
for at least one of the coupling elements, the plunger pushes the associated main valve back toward its open position, once the associated safety valve is in the open position.

Owing to the invention, the fact that, for at least one of the coupling elements, the main valve is pushed back toward its open position by the plunger, one ensures that the safety valve has entered the open position and stays in the open position upon opening of the main valve and upon opening of the other safety valve, during the passage from the unpaired configuration to the paired configuration. Via each secondary passage, a fluid communication is provided between, on the one hand, each rear chamber and, on the other hand, an intermediate volume defined by the body of the female coupling element and the front volume of the male coupling element. This allows a rapid decrease in the pressure in the rear chamber(s), such that the force to be provided for this pairing is decreased. Owing to the arrangement of the sealing gasket, the tightness of the intermediate volume is maximal in the paired configuration, and during pairing, so as to limit any leakage risk of the transported fluid.

Other optional and advantageous features of the invention are defined hereinafter:
For at least one of the coupling elements:
the main valve comprises a forward extension, passed through by openings for the passage of fluid at the main passage in the open position of said main valve, and
the body of said coupling element comprises an inner radial surface radially guiding the forward extension in said body.
The main spring of the coupling element that comprises the forward extension is positioned radially between the body of said coupling element and the forward extension.
The forward extension is formed in the female coupling element and the forward extension is in contact with the front part of the body of the male coupling element in the paired configuration.

During a passage from the unpaired configuration to the paired configuration, the plunger of each coupling element abuts rearwardly against the associated main valve, and thus pushes the associated main valve back toward its open position.
For at least one of the coupling elements, the secondary passage is open between the rear chamber and the front volume for any axial position of the plunger of said coupling element relative to the associated main valve when said plunger is in the withdrawn configuration.
For each of the two coupling elements, the plunger protrudes toward the front of the associated main valve, irrespective of the axial position of said plunger relative to said main valve.
For at least one of the coupling elements, the plunger is axially movable relative to the associated safety valve.
At least one ball, housed both in a longitudinal slot of the main valve and in a peripheral groove of the plunger, forms a front stop of the plunger against the main valve in the forward configuration of the plunger.
The safety valve forms a ball for closing the secondary passage.
For at least one of the coupling elements, the plunger and the safety valve are axially secured.
Each plunger comprises a front end surface, the front end surfaces of the two plungers having a complementary shape and being configured to cooperate with one another, when the plungers are placed in contact against one another during the passage from the unpaired configuration to the paired configuration.
One of the front end surfaces is convex and has a conical shape centered on the central longitudinal axis of the coupling element to which said front end surface belongs, while the other front end surface is concave and has a complementary conical shape, centered on the central longitudinal axis of the other coupling element.
In particular, the apical angles of the conical front end surfaces are preferably equal.
For at least one of the coupling elements:
the main valve comprises a front rod, extending in front of the closing part and housing the plunger, the front rod having a smaller diameter compared to the closing part; and
the length of said plunger is greater than twice the inner diameter of the front volume of said coupling element.
For at least one of the coupling elements:
the coupling element comprises a rear part, secured to the body, and comprising a skirt,
the main spring of said coupling element bears on the rear part and on the main valve of said coupling element,
said main valve comprises a rear rod that extends behind the closing part and that is guided radially in the rear part, and
the skirt of the rear part is radially inserted between said main spring and the fluid circulating in the rear part of said coupling element in the paired configuration.
The body of the male coupling element comprises a cylindrical front outer surface and a cylindrical intermediate outer surface, the intermediate outer surface being offset toward the rear relative to the front outer surface and having a diameter larger than the diameter of the front outer surface; the body of the female coupling element comprises a cylindrical front inner surface and a cylindrical intermediate inner surface, which delimit part of the front volume of the female coupling element, the intermediate inner surface being offset toward the rear relative to the front inner surface and having a diameter smaller than the diameter of the front inner surface; and in the paired configuration, the intermediate outer surface is fitted with the front inner surface and the front outer surface is fitted with the intermediate inner surface.

BRIEF DESCRIPTION OF THE SEVERAL VIEWS OF THE DRAWINGS

Other particularities and advantages of the invention will also appear in the description below. In the appended drawings, provided as non-limiting examples:

FIG. 2 is a cross-section of a detail of FIG. 1, along a section line II-II;

FIG. 3 is a detail of FIG. 1 according to box III, shown on a larger scale,

DETAILED DESCRIPTION OF THE INVENTION

Figure 1:
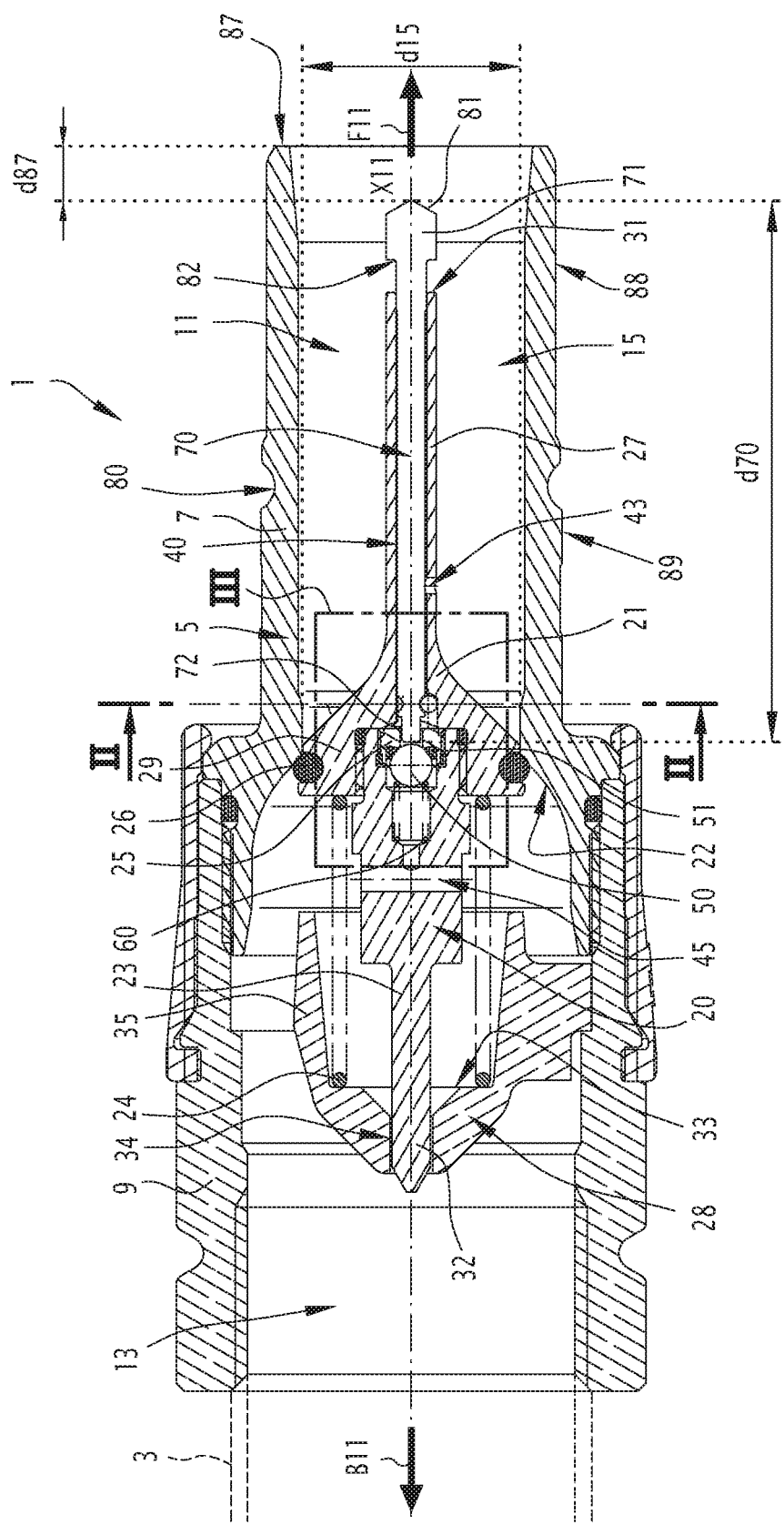
FIG. 1 is a longitudinal sectional view of a male coupling element belonging to a fluid coupling according to a first embodiment according to the invention.

Hereinafter, "associated" defines two parts of a same coupling element.

Considering the first embodiment illustrated in FIGS. 1 to 9, a fluid coupling is shown. This fluid coupling comprises two coupling elements, namely a male coupling element 1, shown alone in FIG. 1, and a female coupling element 101, shown alone in FIG. 5. The coupling elements 1 and 101 are complementary. The male coupling element 1 is intended to be fluidly connected to a fluid pipe end 3, shown in broken lines in FIG. 1. The female coupling element 101 is intended to be fluidly connected to a fluid pipe end 103, shown in broken lines in FIG. 5.

This coupling can advantageously be classified as "quick coupling", and allows fluid pairing, i.e., connecting, and unpairing, i.e., separating, of the fluid pipe ends 3 and 103, without tools.

Figure 5:
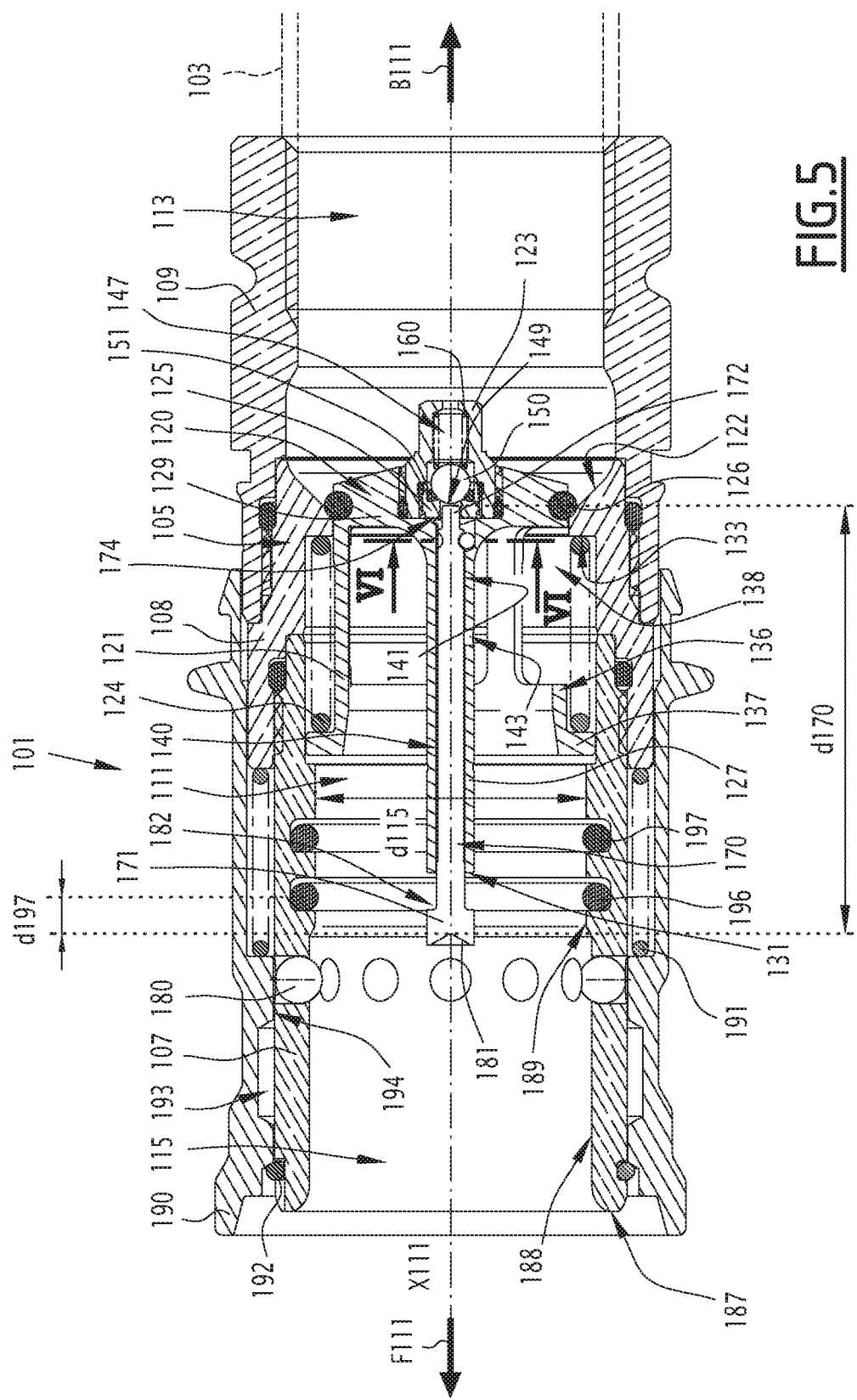
FIG. 5 is a longitudinal sectional view of a female coupling element belonging to the fluid coupling of the preceding figures.

In FIGS. 1 and 5, the coupling elements 1 and 101 are shown in the unpaired configuration of the coupling, which is obtained when the coupling elements 1 and 101 are separated.

The coupling shown in FIGS. 1 to 9 is in particular provided for coupling ends of a pipe for a pressurized fluid, in particular a liquid with a coolant function, for example comprising water and an appropriate additive. However, other types of fluids can be transported via the coupling of FIGS. 1 to 9.

The pressure of the fluid can reach about 20 bars in one of the fluid pipes 3 and 103, when the coupling is in the unpaired configuration.

As in particular illustrated in FIG. 1, the male coupling element 1 comprises a body 5, called "male body", with a generally tubular shape. The body 5 comprises a front part 7 and a rear part 9, which, in the present example, are respectively formed by two parts assembled using a sealing gasket.

The male body 5 delimits an inner pipe 11 extending along a central longitudinal axis X11 of the coupling element 1. For any feature of the coupling element 1, "axial" refers to a direction parallel to the axis X11, and "radial" to a radial direction relative to the axis X11.

The male coupling element 1 defines, parallel to the axis X11, a front direction F11 and a rear direction B11 opposite the front direction F11. The direction F11 is oriented on the side of the front part 7 and the direction B11 on the side of the rear part 9. The expressions "front" and "rear", assigned to any feature of the coupling element 1, respectively refer to the directions F11 and B11.

The inner pipe 11 passes all the way through the body 5, emerging at the front and the rear of the body 5. The inner pipe 11 comprises a rear chamber 13, emerging at the rear of the body 5. The fluid pipe 3, connected to the rear part 9, is connected to the mouth of the rear chamber 13.

The pipe 11 comprises a front volume 15, emerging at the front of the body 5. Preferably, the front volume 15 is, for the most part or in its entirety, annular and coaxial with the axis X11.

As explained hereinafter, the coupling element 1 comprises two valves, comprising a main valve 20 and a safety valve 50.

Figure 7:
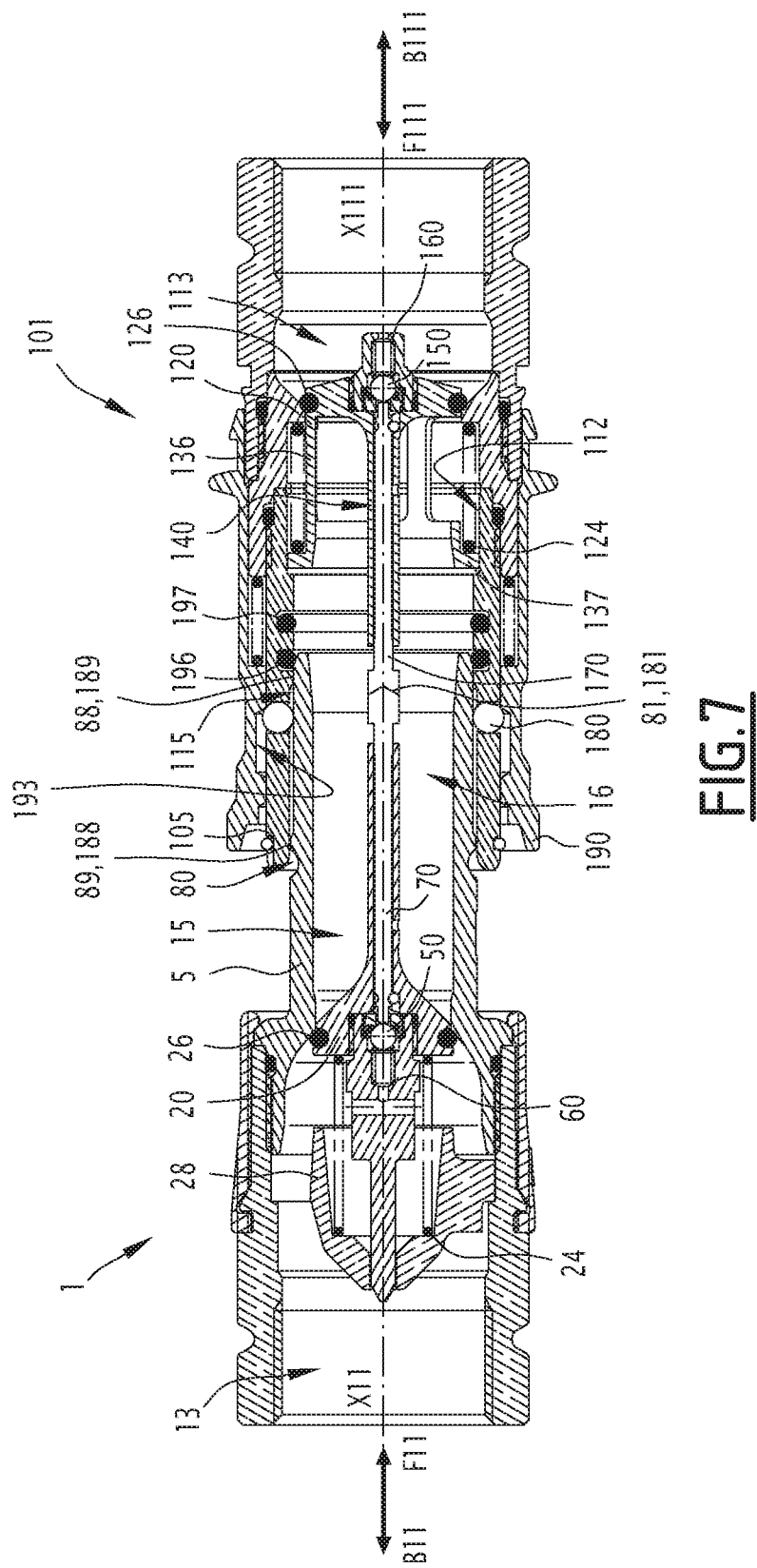
FIGS. 7, 8 and 9 are longitudinal sectional views, in a same plane, of the fluid coupling of the preceding figures, showing the male coupling element and the female coupling element in three different configurations.
Figure 8:
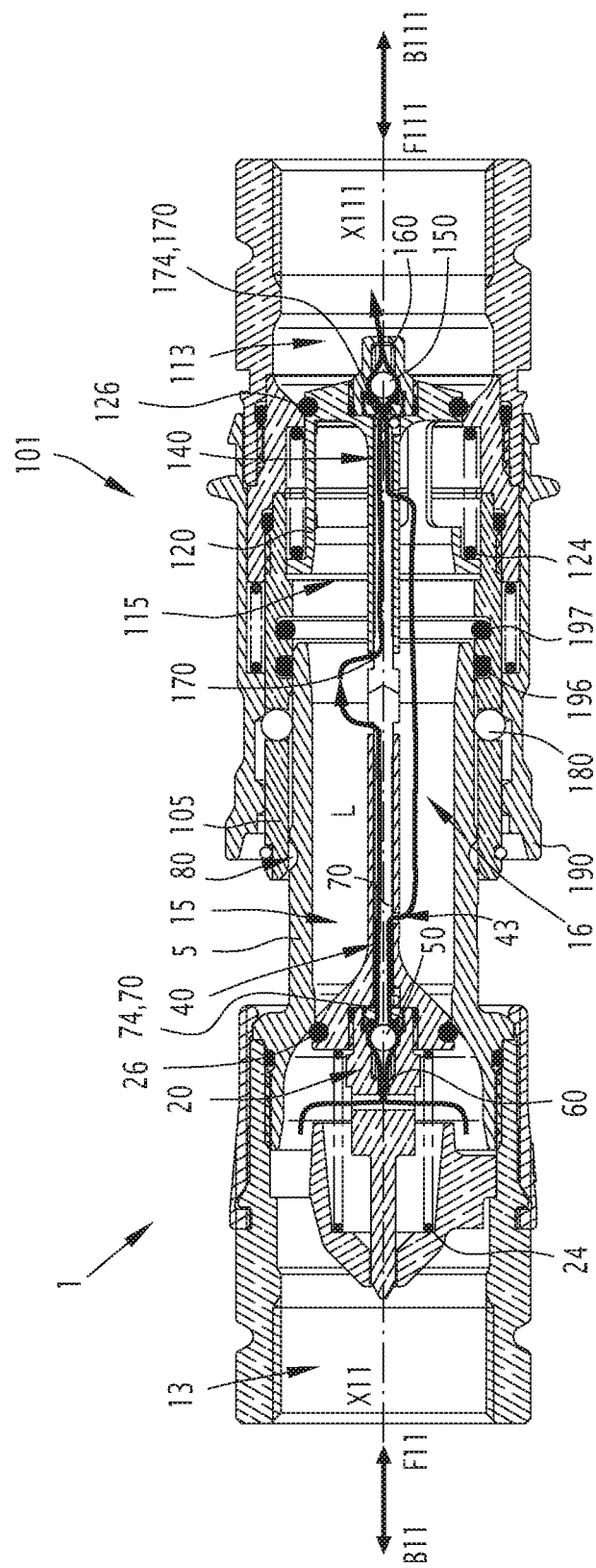
Figure 9:
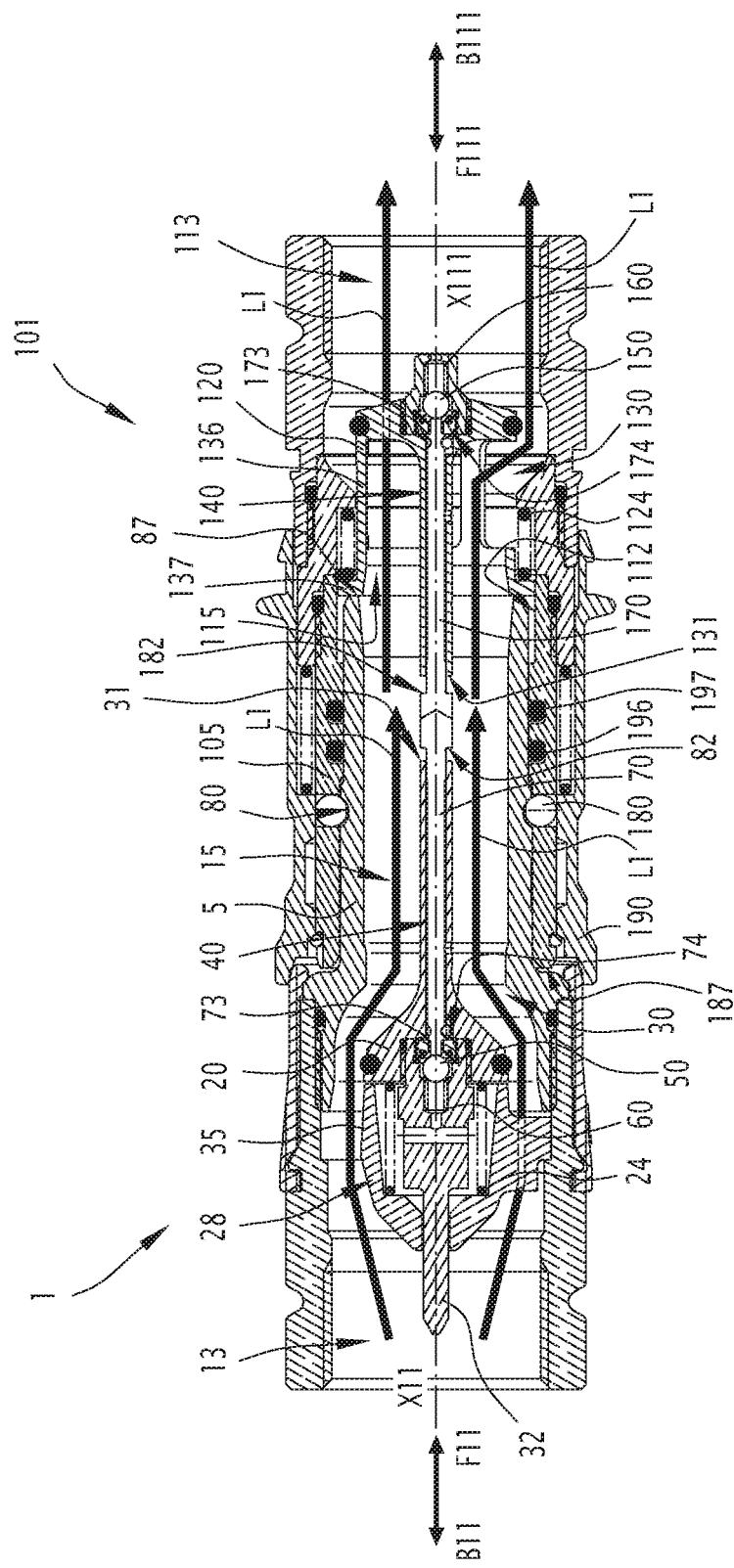

The male main valve 20 is housed inside the pipe 11. The main valve 20 is movable relative to the body 5, in translation parallel to the axis X11 between a closed position and an open position. In FIGS. 1, 7 and 8, the closed position of the main valve 20 is illustrated. In FIG. 9, the open position of the main valve 20 is illustrated.

In the closed position, the main valve 20 is axially abutting, i.e., bearing parallel to the axis X11, in the direction F11, against a seat 22 formed by the male body 5, in the pipe 11, so as to obstruct the fluid communication between the rear chamber 13 and the front volume 15 at a main passage 30 between the main valve 20 and the body 5. More generally, the seat 22 separates the rear chamber 13 and the front volume 15.

In the closed position of the main valve 20, a sealing gasket 26, for example made from elastomer, is inserted axially between the main valve 20 and the body 5. In particular, this gasket 26 is housed in an outer groove of the main valve 20 and cooperates axially with the body 5, in particular its seat 22, in the closed position of the main valve 20.

The open position of the main valve 20 is withdrawn, i.e., offset along the direction B11, relative to its closed position. In the open position, the main valve 20 is separated from the seat 22 in the direction B11. As shown in FIG. 9, in the open position, the main passage 30 for the fluid is formed between a closing part 29 of the main valve 20 and the body 5. The closing part 29 bears the gasket 26. In the open position, the main valve 20 thus allows a fluid communication between the rear chamber 13 and the front volume 15, which is done through the main passage 30. The main passage 30 extends around the main valve 20, in particular around the closing part 29, when the main valve 20 is in the open position. In particular, the main passage 30 is an annular passage formed between the main valve 20 and the seat 22.

Figure 4:
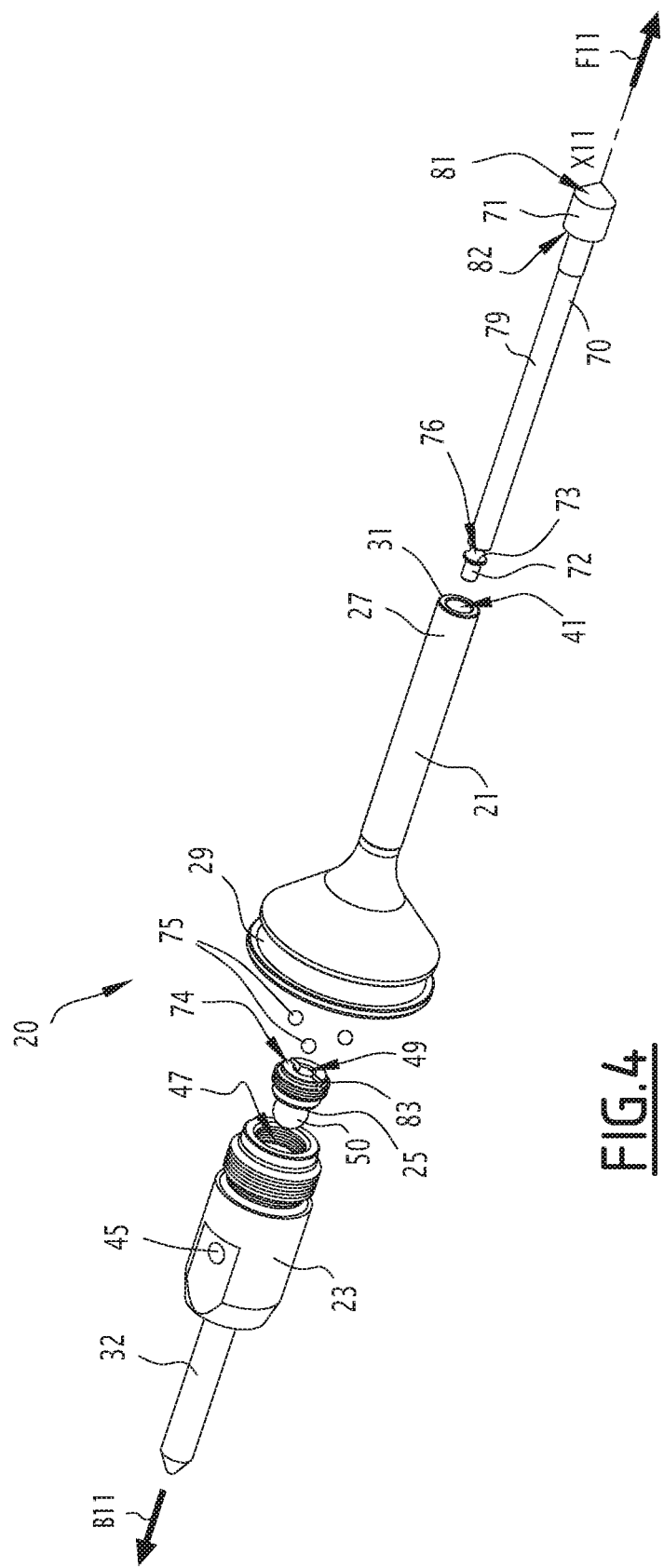
FIG. 4 is a perspective of an exploded view of part of the male coupling element of FIG. 1.

In the present example, as is in particular visible in FIG. 4, the main valve 20 comprises, distributed axially, a main body 21, housing the gasket 26, and a rear body 23, located in direction B11 relative to the body 21 and fixedly assembled with the body 21, in particular by screwing of the body 23 in the body 21. The rear part of the main body 21 forms the closing part 29. The main valve 20 of the present example further comprises an intermediate body 25, which in turn is fastened to the inside of the rear body 23, abutting against the rear body 23 in the direction B11.

In the closed position, axially, the main body 21 extends essentially in the front volume 15, in front of the seat 22. The main body 21 comprises a front rod 27, which extends in front of the closing part 29 and which has a reduced outer diameter, in particular compared with the outer diameter of the closing part 29, at the sealing gasket 26. The front rod 27 is preferably coaxial with the central longitudinal axis X11.

The main valve 20 could be formed in one piece, or by a tight assembly of bodies such as the bodies 21, 23 and 25 or different bodies, while nevertheless having the front rod 27, the closing part 29, and any other feature presently described.

The coupling element 1 comprises a mechanical main spring 24, which pushes the main valve 20 back against the seat 22, i.e., in the closed position, in the direction F11. The main spring 24 is preferably a helical compression spring, coaxial with the axis X11. The main spring 24 exerts a resilient return force, parallel to the axis X11, on the main valve 20, tending to push the main valve 20 back in the direction F11 relative to the body 5.

To that end, the main spring 24 is advantageously positioned behind the main valve 20 so as to bear on the main valve 20 in the direction F11. The main spring 24 also bears on the body 5 in direction B11, in particular against a rear part 28 of the coupling element 1, secured to the body 5, in particular in the direction B11 and in the radial direction, and positioned inside the rear chamber 13. More specifically, the bearing of the main spring 24 is done against an axial surface 33 of the rear part 28, turned in direction F11 and the rear part 28 is pushed back by the main spring 24 to abut against the body 5 in the direction B11.

Preferably, the main valve 20 forms a rear rod 32 that extends behind the closing part 29. This rear rod 32 is preferably coaxial to the axis X11. In the example, this rear rod 32 is formed by the rear body 23. The rear rod 32 slides axially in a through orifice 34 of the rear part 28. In other words, the rear rod 32 is engaged and guided radially in the rear part 28. The rear rod 32 thus serves as a guide for the movement of the main valve 20 between its open position and its closed position.

The main spring 24 advantageously surrounds the rear rod 32. The axial surface 33 of the rear part 28 surrounds the guide orifice 34 of the rear rod 32. Preferably, the rear part 28 comprises a skirt 35, or bell, coaxial with the axis X11, open in the front direction F11. In the illustrated example, the bottom of the skirt 35, in direction B11, is formed by the surface 33 and pierced by the orifice 34. The skirt 35 is for example obtained by spot facing of the part 25. In the open position of the main valve 20, the closing part 29 of the main valve 20 comes into contact with, or is close to, the free edge of the skirt 35, as shown in FIG. 9. The main spring 24 is then contained, at least for an essential part, or preferably more than 90% of its compressed length along the axis X11, inside the skirt 35, so as to be protected. Specifically, the main spring 24 is contained in the housing delimited not only by the skirt 35, but also by the closing part 29, attached against or close to the skirt 35. More generally, in the paired configuration, the rear part 28 is radially inserted between the main spring 24 and the fluid circulating in the rear chamber 13, in order to protect the main spring 24 from the stream of fluid passing axially through the pipe 11. Thus, the lifetime of the main spring 24 is considerably increased.

The main valve 20 delimits a secondary passage 40, which passes through the main valve 20. The secondary passage 40 emerges on the one hand in the rear chamber 13 and on the other hand in the front volume 15, so as to fluidly connect them, when the secondary passage 40 is not closed off.

The front rod 27 is hollowed out in its center, i.e., it is tubular. This recess forms an axial subpart 41 of the secondary passage 40. The axial subpart 41 is coaxial with the axis X11, and emerges axially, in the direction F11, at a front end 31 of the front rod 27, in the front volume 15.

Preferably, the recess of the front rod 27 also comprises a radial part 43 of the secondary passage 40, which emerges in the front volume 15 in a radial direction, via an orifice emerging at a radial outer wall of the front rod 27. This radial part 43 is located between the front end 31 and the closing part 29.

The rear body 23 comprises a recess that forms a rear part of the secondary passage 40 emerging in the rear chamber 13 in the closed position of the main valve 20. Here, the recess of the rear body 23 forms two radial parts 45 of the secondary passage 40, each emerging in the rear chamber 13 at an outer radial wall of the rear body 23. The recess of the rear part also forms an axial subpart 47 of the secondary passage 40, preferably coaxial with the axis X11. The axial subpart 47 is fluidly connected, in direction B11, to the radial parts 45, and emerges, in direction F11, in an axial subpart 49 of the secondary passage 40, formed by the intermediate body 25. To that end, the intermediate body 25 is tubular, in particular coaxial to the axis X11.

Here, the axial subpart 41 of the secondary passage 40 also emerges, in direction B11, in the axial subpart 49 of the intermediate body 25.

The safety valve 50 is housed in the secondary passage 40 of the main valve 20, in particular in the subparts 47 and 49.

The safety valve 50 is movable in the secondary passage 40 parallel to the axis X11 and relative to the main valve 20 between a closed position and an open position. The closed position is illustrated in FIGS. 1, 3 and 7. The open position is illustrated in FIGS. 8 and 9.

As is in particular visible in FIG. 3, in the closed position, the safety valve 50 is abutting axially in the direction F11 against an inner seat 51 belonging to the main valve 20. In the closed position, the safety valve 50 cooperates with the seat 51 to close off the secondary passage 40 and thus to prevent the passage of fluid through the secondary passage 40, between the rear chamber 13 and the front volume 15.

The safety valve 50 preferably assumes the form of a ball, i.e., a solid spherical element, as illustrated in FIGS. 1, 3 and 7-9. The inner seat 51 is preferably formed by a sealing liner, for example conical, which can assume the form of an elastomer seal. This sealing liner is attached to the intermediate body 25 of the main valve 20. In the closed position, the ball of the safety valve 50 cooperates with the sealing liner to close off the secondary passage 40.

The open position of the safety valve 50 is withdrawn, i.e., offset along the direction B11, relative to its closed position. In the open position, the safety valve 50 is separated from the seat 51 in the direction B11 to allow the circulation of fluid through the secondary passage 40. The fluid crosses the safety valve 50 while circulating radially around the safety valve 50.

The coupling element 1 comprises a mechanical secondary spring 60, which returns the safety valve 50 against the seat 51, i.e., toward its closed position, in the direction F11 relative to the main valve 20. The secondary spring 60 is preferably a helical compression spring, coaxial with the axis X11.

To that end, the secondary spring 60 is advantageously positioned behind the safety valve 50 so as to bear on the safety valve 50 in the direction F11. The secondary spring 60 also bears on the main valve 20 in the direction B11, in particular against an axial surface of the rear body 23 provided in the secondary passage 40. The resilient force developed by the secondary spring 60 is advantageously less than the resilient force developed by the main spring 24. The difference in resilient force of the main 24 and secondary 60 springs contributes to guaranteeing that the safety 50 and main 20 valves are placed in the open position sequentially in the desired order.

The coupling element 1 also comprises a plunger 70. In the present example, the plunger 70 assumes the form of a solid rod.

The plunger 70 is mounted essentially inside the main valve 20. In particular, the plunger 70 is mounted partially in the secondary passage 40. More specifically, the plunger 70 is received inside the front rod 27, which surrounds the plunger 70 like a sleeve. In particular, the plunger 70 is received in the axial subpart 41 of the secondary passage 40, over the entire length of the axial subpart 41. A front end 71 of the plunger 70 protrudes from the front end 31 in the direction F11. A rear end 72 of the plunger 70 protrudes into the subpart 49 in the direction B11.

The plunger 70 is movable relative to the body 5, relative to the associated main valve 20, and relative to the associated safety valve 50, parallel to the axis X11.

In particular, the front rod 27 serves as a guide for the axial sliding of the plunger 70 in the main valve 20. As shown in FIG. 3, the plunger 70 comprises a front portion 79. The front portion 79 and the rear end 72 are advantageously cylindrical with a circular base. Preferably, the outer diameter of the rear end 72 is smaller than the outer diameter of the portion 79. Preferably, the front rod 27, with a shape corresponding to the front portion 79, surrounds the front portion 79 with the smallest possible radial play, but which nevertheless allows a circulation of fluid along the plunger 70, within the subpart 41, between the axial subpart 49 and the front volume 15 such that the plunger 70 in itself does not close off the communication between the rear chamber 13 and the front volume 15. Fluid, circulating along the plunger 70, in particular the front portion 79, can pass through the radial part 43 of the secondary passage 40, or the front end 31.

Preferably, as shown in particular in FIGS. 2 and 3, the coupling element 1 comprises three balls 75 for guiding the sliding of the plunger 70 in the main valve 20. A peripheral groove 76 of the plunger 70, near the rear end 72, receives the three balls 75. Engaged in the peripheral groove 76, the balls 75 are axially secured to the plunger 70. Each ball 75 is also received in a respective longitudinal slot 77 arranged in the main body 21 at the rear end of the axial subpart 41 of the secondary passage 40 of the main valve 20. Each one of the balls 75 is engaged with one of the three slots 77 of the main valve 20 regularly distributed around the axis X11. Each slot 77 is blind in the direction F11 and open in the direction B11.

The plunger 70 is movable, relative to the main valve 20, between a forward position in the direction F11, shown in FIGS. 1, 3 and 7, and a withdrawn position in the direction B11, shown in FIGS. 8 and 9. In its withdrawal between the forward position and the withdrawn position, the plunger 70 can also reach an intermediate position, which is described hereinafter. When the plunger 70 is withdrawn relative to the intermediate position, the plunger 70 is said to be in a "withdrawn configuration". When the plunger 70 is positioned in the intermediate configuration (inclusive) in the forward position, the plunger 70 is said to be in the "forward configuration".

Preferably, to limit the travel of the plunger 70 in the main valve 20 to the withdrawn position in the direction B11, as shown in FIGS. 8 and 9, the plunger 70 abuts axially against the main valve 20. In particular, a distal shoulder 73 of the plunger 70, formed between the rear end 72 and the front portion 79, and delimiting the back of the peripheral groove 76, bears in the direction B11 against an inner stop surface 74 of the intermediate body 25 of the main valve 20. These elements are better visible in FIGS. 3 and 4.

Preferably, to limit the travel of the plunger 70 in the main valve 20 to the forward position in the direction F11, the balls 75 respectively abut in direction F11 against the blind end of the slots 77. In other words, the translational movement of the plunger 70 in the main valve 20 is limited in the forward direction by the three balls 75 abutting forwardly against the main valve 20, these balls 75 being able to be classified as "ball thrusts". In the forward position, the plunger 70 thus abuts forwardly against the main valve 20.

As in particular visible in FIG. 3, in the forward position of the plunger 70, the rear end 72 of the plunger 70 is axially separated from the safety valve 50.

In the intermediate position, not illustrated, the plunger 70 abuts rearwardly against the safety valve 50, whereas the latter is in the closed position, i.e., bearing against the seat 51.

In the forward configuration of the plunger 70 and in the unpaired configuration of the coupling element 1, the plunger 70 is freely axially movable between the intermediate position and the forward position. In the forward configuration of the plunger 70, the safety valve 50 is kept in the closed position by the secondary spring 60, against the seat 51. The distal shoulder 73 of the plunger 70 is separated from the inner stop surface 74 of the main valve 20.

In the withdrawn configuration of the plunger 70, the rear end 72 of the plunger 70 is abutting rearwardly against the safety valve 50, which is then inserted between the end 72 and the secondary spring 60. As a result, from the intermediate configuration toward the withdrawn configuration of the plunger 70, the plunger 70 and the safety valve 50 are connected in the axial position. Indeed, the secondary spring 60 keeps the safety valve 50 in axial contact with the plunger 70. When the plunger 70 is moved in the direction B11, once the plunger 70 reaches the intermediate position, it comes into contact with the safety valve 50 and moves it into the open position, i.e., separates it from the seat 51. By continuing the movement of the plunger 70 in the direction B11, the safety valve 50 is moved further away from the seat 51, such that the opening of the secondary passage 40 is maximal. In other words, irrespective of the position of the plunger 70 relative to the safety valve 20 along the axis X11 when the plunger 70 is in the withdrawn configuration, the safety valve 50 keeps the secondary passage 40 open between the rear chamber 13 and the front volume 15.

The front end 71 extends past the front end 31 along the direction F11, irrespective of the relative position of the plunger 70 with respect to the main valve 20, in particular, even if the plunger 70 is in the withdrawn position.

As illustrated in the figures, the front end 71 forms a front end surface 81 in relief, which is preferably convex and conical, centered on the axis X11. For example, the apical angle of the cone is about 120°. Opposite the front end surface 81, i.e., in the direction B11, the front end 71 forms a proximal shoulder 82, facing the rear. At least 75% of the length d70 of the plunger 70 is housed in the main valve 20 when the plunger 70 is in the forward position, i.e., abutting forwardly against the main valve 20. The length of the plunger 70 is measured parallel to the axis X11, from the front end 71 to the rear end 72.

Preferably, the length of the plunger 70 is greater than twice the inner diameter d15 of the inner pipe 11, at the height of the front volume 15. The inner diameter of the front volume 15 corresponds to the minimum inner diameter of the front part 7 at the front of the seat 22.

The coupling being in the unpaired configuration as shown in FIGS. 1 to 3, the main 20 and safety 50 valves are in the closed position and the plunger 70 is in the forward configuration.

A non-nil axial distance d87 is defined between a front face 87 of the male body 5 and the front end 71 of the plunger 70, when the plunger 70 is in the forward position, and the main valve 20 is in the closed position. This distance d87 is measured parallel to the axis X11. For the end 71, the distance d87 is measured on the central axis X11. In this unpaired configuration, in the forward position, the plunger 70 is then withdrawn from the front face 87 of the male body 5, i.e., the end 71 is offset in the direction B11 relative to the front face 87.

The body 5 comprises a front outer surface 88 and an intermediate outer surface 89 that are cylindrical with a circular base, coaxial with the axis X11. The outer surfaces 88 and 89 are defined on the front part 7 of the body 5. Axially, the front outer surface 88 advantageously extends from the front face 87, and is immediately followed by the intermediate outer surface 89, along the direction B11. Preferably, the intermediate outer surface 89 has a diameter larger than that of the front outer surface 88.

The body 5 has an outer peripheral locking groove 80, capable of cooperating with locking members 180 of the female coupling element 101, which are described hereinafter. In the present example, the outer peripheral groove 80 is arranged at the intermediate outer surface 89.

The female coupling element 101 has an operation essentially similar to that of the male coupling element 1, although the female coupling element 101 differs from the male coupling element 1 in its form, for a certain number of component elements. The elements of the female coupling element 101 with a function or geometry shared with those of the male coupling element 1 are referenced with the same reference numbers increased by 100 and their description done for the male coupling element 1 applies for the female coupling element 101 unless otherwise specified.

As in particular illustrated in FIG. 5, the female coupling element 101 comprises a body 105, called "female body", with a generally tubular shape. The body 105 comprises several parts 107, 108, 109 assembled with the insertion of separate sealing gaskets.

The female body 105 delimits an inner pipe 111 extending along a central longitudinal axis X111 of the coupling element 101. For any feature of the coupling element 101, "axial" refers to a direction parallel to the axis X111, and "radial" to a radial direction relative to the axis X111.

The female coupling element 101 defines, parallel to the axis X111, a front direction F111 and a rear direction B111 opposite the front direction F111. The direction F11 is oriented on the side of the front part 107 and the direction B11 on the side of the rear part 109. The expressions "front" and "rear", assigned to any feature of the coupling element 101, respectively refer to the directions F111 and B111.

The inner pipe 111 passes all the way through the body 105, emerging at the front and the rear of the body 105. The inner pipe 111 comprises a rear chamber 113, emerging at the rear of the body 105. The pipe end 103, positioned behind the coupling element 101, is connected to the mouth of the rear chamber 113, at the rear part 109. The pipe 111 comprises a front volume 115, emerging at the front of the body 105. Preferably, the front volume 115 is, for the most part or in its entirety, cylindrical with a circular base and coaxial with the axis X11.

As explained hereinafter, the coupling element 101 comprises two valves, comprising a main valve 120 and a safety valve 150.

The main valve 120 is housed inside the pipe 111. The main valve 120 is movable relative to the body 105, in translation parallel to the axis X111 between a closed position and an open position. In FIGS. 5, 7 and 8, the closed position of the main valve 120 is illustrated. In FIG. 9, the open position of the main valve 120 is illustrated.

In the closed position, a closing part 129 of the main valve 120 abuts axially, in the direction B111, against the seat 122 formed in the body 105, so as to close off the fluid communication of the pipe 111 between the rear chamber 113 and the front volume 115 at a main passage 130. More generally, the seat 122 separates the rear chamber 113 and the front volume 115.

In the closed position of the main valve 120, a sealing gasket 126 is inserted axially between the main valve 120 and the body 105, more specifically its seat 122. In particular, this gasket 126 is housed in an outer groove of the closing part 129 of the main valve 120 and cooperates axially with the body 105, in particular its seat 122, in the closed position of the main valve 120.

In the present example, as is particularly visible in FIG. 5, and like for the main valve 20, the main valve 120 comprises several bodies 121, 123, 125, distributed axially, fixedly assembled by screwing. The main valve 150 comprises a front rod 127, extending in front of the closing part 129 and having a smaller outer diameter, in particular compared with the diameter of the closing part 129. The front rod 127 is preferably coaxial with the axis X111.

Attached to the closing part 129 and oriented in the direction F111, the main valve 120 comprises a tubular front extension 136. The front extension 136 forms a bell pierced with several fluid circulation openings 138. The front extension 136 radially surrounds the front rod 127 and extends over only part of its length, parallel to the axis X111. Here, the front extension 136 is formed by the same part as the closing part 129.

The main valve 120 could be formed in one piece, or by an assembly of bodies different from that of the bodies 121, 123 and 125, while nevertheless having the front rod 127, the closing part 129, and any other feature presently described.

The open position of the main valve 120 is withdrawn, i.e., offset along the direction B111, relative to the closed position. In the open position, the main valve 120 is separated from the seat 122 in the direction B111. As shown in FIG. 9, in the open position, the main passage 130 for the fluid is formed between the outer surface of the main valve 120, in particular the closing part 129, and the body 105. The main passage 130 is formed between the rear chamber 113 and the front volume 115, in particular at their axial border. In the open position, the main valve 120 thus allows a fluid communication between the rear chamber 113 and the front volume 115, which is done through the main passage 130 and openings 138.

In the open position of the main valve 120, the fluid can pass all the way through the pipe 111, by circulating through the main passage 130. For example, if fluid is supplied by the male coupling element 1 while the coupling is in the paired configuration, the fluid can then flow along the direction B111, as shown by the arrows L1 in FIG. 9. In this case, the fluid first flows around the front rod 127, then rushes, radially outward, through openings 138 of the front extension 136, to lastly pass through the open main passage 130, around the closing part 129. When the fluid circulates in the direction opposite the direction F111, a reverse path is adopted.

The coupling element 1 comprises a mechanical main spring 124, which recalls the main valve 120 back against the seat 122, i.e., in the closed position, in the direction F111. The main spring 124 is preferably a helical compression spring, coaxial with the axis X111. The main spring 124 exerts a resilient return force, parallel to the axis X111, on the main valve 120, relative to the body 105, pushing the main valve 120 back in the direction F11 relative to the body 105.

To that end, the main spring 124 is advantageously positioned axially along and radially around the front extension 136 of the main valve 120, so as to bear on the main valve 120 in the direction F111, at an outer collar 137 of the front extension 136 of the main valve 120. The main spring 124 also bears on the body 105 in the direction B111. More specifically, the bearing of the main spring 124 is done against an axial surface 133 of the body 105, facing direction F111. The main spring 124 is thus housed, relatively closely, in a housing defined by the front extension 136, the collar 137, an inner radial surface 112 of the pipe 111, and the surface 133, so as to be protected from the circulation of fluid in the coupling, in the paired configuration of the coupling. More generally, the main spring 124 is positioned radially between the body 105 and the front extension 136.

In the present example, the female main valve 120 is guided in its axial translation between the open and closed positions by the front extension 136, which slides along the inner radial surface 112 of the pipe 111. More specifically, the outer collar 137 cooperates with, and is radially guided by, the inner radial surface 112 to obtain this axial translation. The collar 137 is in contact with the inner radial surface 112 with reduced play. In a variant, the features of the female coupling element 101 relative to the main valve 120, in particular relative to the front extension 136 and the main spring 124, can be implemented for the male coupling 1, replacing the rear part 28 and the main spring 24. In a variant, the features of the female coupling element 1 relative to the main valve 20, in particular relative to the front extension 28 and the main spring 24, can be implemented for the male coupling 101, replacing the rear part 136 and the main spring 124.

The main valve 120 delimits a secondary passage 140, for the fluid, that passes all the way through the main valve 120 along the axis X111, unlike the main valve 20 that comprises the radial passages 45. The secondary passage 140 emerges on the one hand in the rear chamber 113 and on the other hand in the front volume 115, so as to fluidly connect them, when the secondary passage 140 is not closed off.

The front rod 127 is hollowed out in its center, i.e., it is tubular. This recess forms an axial subpart 141 of the secondary passage 140. The subpart 141 is coaxial with the axis X111, and emerges, in the direction F111, at a front end 131 of the front rod 127, in the front volume 115.

Preferably, the recess of the front rod 127 also comprises a radial part 143 of the secondary passage 140, which emerges in the front volume 115 in a radial direction, at a radial outer wall of the front rod 127.

Here, the recess of the rear body 123 forms an axial part 147 of the secondary passage 140, coaxial to the axis X111 and emerging in the direction B111 in the rear chamber 113. Here, the axial subpart 141 of the secondary passage 140 also emerges, in direction B111, in the axial subpart 149 of the intermediate body 125. The subpart 149 thus fluidly connects the subparts 141 and 147 to one another.

More generally, the secondary passage 140 comprises an axial part, coaxial with the axis X111, that extends from the front end 131 to the opposite axial end of the main valve 120, behind the closing part 129. The secondary passage 140 also emerges in the front volume 115, via the part 143.

The safety valve 150 is housed in the secondary passage 140 of the main valve 120. Its operation is essentially identical to that of the safety valve 50 of the male coupling element 1.

The safety valve 150 is movable in the secondary passage 140 parallel to the axis X111 and relative to the main valve 120 between a closed position and an open position. The closed position is illustrated in FIGS. 5 and 7. The open position is illustrated in FIGS. 8 and 9.

As visible in particular in FIG. 5, in the closed position, the safety valve 150 is abutting axially in the direction F111 against an inner seat 151 belonging to the main valve 120. In the closed position, the safety valve 150 cooperates with the seat 151 to close off the secondary passage 140 and thus to prevent the passage of fluid through the secondary passage 140, between the rear chamber 113 and the front volume 115.

The safety valve 150 preferably assumes the form of a ball. The inner seat 151 is preferably formed by a sealing liner, for example conical, which can assume the form of an elastomer seal. In the closed position, the ball of the safety valve 150 cooperates with the sealing liner to close off the secondary passage 140.

In the open position, the safety valve 150 is separated from the seat 151 in the direction B111 to allow the circulation of fluid through the secondary passage 140. The fluid then generally circulates parallel to the axis X111. The fluid crosses the safety valve 150 while circulating around the safety valve 150.

The coupling element 101 comprises a mechanical secondary spring 160, which recalls the safety valve 150 back against the seat 151, i.e., in the closed position, in the direction F111. The secondary spring 160 is preferably a helical compression spring, coaxial with the axis X111.

To that end, the secondary spring 160 is advantageously positioned behind the safety valve 150 so as to bear on the safety valve 150 in the direction F111. The secondary spring 160 also bears on the main valve 120 in the direction B111, in particular against an axial face provided in the secondary passage 140. The coupling element 101 also comprises a plunger 170, which is preferably similar to the plunger 70. In the present example, the plunger 170 essentially assumes the form of a solid rod. The plunger 170 is mounted essentially inside the main valve 120. In particular, the plunger 170 is mounted in the secondary passage 140. More specifically, the plunger 170 is received inside the front rod 127, which surrounds the plunger 170 like a sleeve. A front end 171 of the plunger 170 protrudes from the end 131 in the direction F111. The plunger 170 is movable relative to the body 105, relative to the associated main valve 120, and relative to the associated safety valve 150, parallel to the axis X111.

In particular, the front rod 127 serves as a guide for the axial sliding of the plunger 170. The plunger has the same geometry as the plunger 70, except for the front end surface 181. Preferably, the main valve 120 surrounds the plunger 170 with the smallest possible radial play, but which nevertheless allows a circulation of fluid along the plunger 170, within the main valve 120, such that the plunger 170 in itself does not close off the communication between the rear chamber 113 and the front volume 115. Fluid, circulating along the plunger 170, can pass through the radial part 143 of the secondary passage 140, or the secondary passage 40 at the front end 131.

Figure 6:
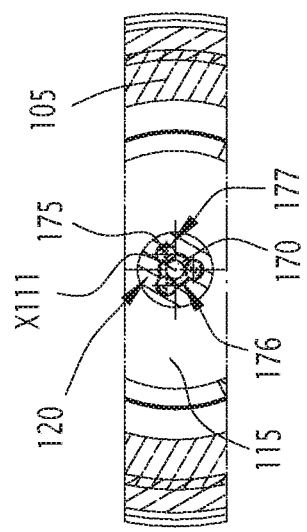
FIG. 6 is a cross-section of a detail of FIG. 5, along a section line VI-VI.

Preferably, as shown in particular in FIGS. 5 and 6, and identically to the coupling element 1, the coupling element 101 comprises three balls 175 for guiding the sliding of the plunger 170 in the main valve 120. A peripheral groove 176 of the plunger 170, near the end 172, receives the three balls 175. Engaged in the groove 176, the balls 175 are axially secured to the plunger 170. Each ball 175 is also received in a respective longitudinal slot 177 arranged in the main valve 120. Each one of the balls 175 is engaged with one of the three slots 177 of the main valve 120. Each slot 177 is blind in the direction F111 and preferably open in the direction B111.

Guided in axial sliding by the main valve 120, the plunger 170 is movable, relative to the main valve 120, between a forward position in the direction F111, shown in FIGS. 5 and 7, and a withdrawn position in the direction B111, shown in FIGS. 8 and 9. Between the forward position and the withdrawn position, the plunger 170 can also reach an intermediate position, which is described hereinafter, like the plunger 70. When the plunger 170 is positioned between the withdrawn position and the intermediate position (not inclusive), the plunger 170 is said to be in a "withdrawn configuration". When the plunger 170 is positioned between the intermediate position (inclusive) and the forward position, the plunger 170 is said to be in a "forward configuration".

Preferably, in the withdrawn position of the plunger 170 in the direction B111, as shown in FIGS. 8 and 9, the plunger 170 is abutting rearwardly against an inner stop surface 174 of the main valve 120. In particular, a distal shoulder 173 of the plunger 170 bears in the direction B111 against the stop surface 174 of the main valve 120.

Preferably, to limit the travel of the plunger 170 to the forward position in the direction F111, the balls 175 respectively abut in direction F111 against the blind part of the slots 177. In the forward position, the plunger 170 abuts forwardly against the main valve 120 by means of ball thrusts 175.

In the intermediate position, not illustrated, the plunger 170 abuts in the direction B111 against the safety valve 150, whereas the latter is in the closed position, i.e., bearing against the seat 151.

In the forward position of the plunger 170, the rear end 172 of the plunger 70 is axially separated from the safety valve 150. In the forward configuration of the plunger 170, the safety valve 150 is kept in the closed position by the secondary spring 160, against the seat 151 and the distal shoulder 173 of the plunger 170 is separated from the inner stop surface 174 of the main valve 120. In the forward configuration, the plunger 170 is freely axially movable between the intermediate position and the forward position. Over this movement range of the plunger 170 that is the forward configuration, the plunger 170 allows the safety valve 150 to be in the closed position.

For the other part of the axial movement travel of the plunger 170 and the main valve 120, namely the withdrawn configuration, the rear end 172 of the plunger 170 is axially bearing against the safety valve 150, which is then inserted between the end 172 and the secondary spring 160. As a result, in this part of the travel of the plunger 170, the plunger 170 and the safety valve 150 are connected in the axial position. Indeed, the secondary spring 160 keeps the safety valve 150 in axial contact with the plunger 170. In the withdrawn configuration, the plunger 170 is able to drive the safety valve 150 in its rearward axial movement. When the plunger 170 is moved in the direction B11, once the plunger 170 reaches the intermediate position, it comes into contact with the safety valve 150 so as to move it into the open position, i.e., to separate it from the seat 151. By continuing the movement of the plunger 170 in the direction B111, the safety valve 150 is moved further away from the seat 151, such that the opening of the secondary passage 140 is maximal. In other words, when the plunger 170 is in the withdrawn configuration, the safety valve 150 keeps the secondary passage 140 open between the rear chamber 113 and the front volume 115, irrespective of the position of the plunger 170 relative to the main valve 120, along the axis X111 between the withdrawn and intermediate positions.

The front end 171 extends past the front end 131 along the direction F111, irrespective of the relative position of the plunger 170 with respect to the main valve 120. In particular, the front end 171 of the plunger 170 protrudes toward the front of the main valve 120, whether the plunger 170 is in the forward configuration or the withdrawn configuration, even if the plunger 170 is in the withdrawn position.

As illustrated in the figures, the front end 171 forms a front end surface 181 in hollow, which is preferably concave and conical, centered on the axis X111. For example, the apical angle of the cone is equal to that of the front end surface 81, or 120°. The respective shapes in relief and hollow of the front end surfaces 81 and 181 are geometrically complementary to form a contact self-centered on the axis X11 and X111 during a placement in axial contact of the plungers 70 and 170 during the pairing and in the paired configuration, as shown in FIGS. 7 to 9. In a variant, shapes other than conical, and other than in hollow and relief reversed between the two plungers 70 and 170, can be chosen.

Opposite the front end surface 181, i.e., in the direction B111, the front end 171 forms a proximal shoulder 182, facing the rear. At least 75% of the length of the plunger 170 is housed in the main valve 120 when the plunger 170 is in the forward position, i.e., abutting forwardly against the main valve 120. The length of the plunger 170 is measured parallel to the axis X111, from the front end 171 to the rear end 172.

Preferably, the length d170 of the plunger 170 is greater than twice the inner diameter d115 of the inner pipe 111, at the height of the front volume 115. The inner diameter of the front volume 115 is the minimum diameter of the inner radial wall of the body 105 in front of the closing part 129.

The coupling being in the unpaired configuration as shown in FIG. 5, the valves 120 and 150 are in the closed position and the plunger 170 is in the forward configuration.

In this unpaired configuration, the plunger 170 is then withdrawn from the front face 187 of the female body 105, i.e., the end 171 is offset in the direction B111 relative to the front face 187.

The body 105 comprises a front inner surface 188 and an intermediate inner surface 189 that are cylindrical with a circular base, coaxial with the axis X111. The intermediate inner surface 189 is advantageously adjacent to the inner radial surface 112. The inner surfaces 188 and 189 delimit part of the front volume 115. Axially, the front inner surface 188 advantageously extends from the front face 187, and is immediately followed by the intermediate inner surface 189, along the direction B111, the inner radial surface 112 being axially located between the intermediate inner surface 189 and the seat 122. Preferably, the intermediate inner surface 189 has a diameter smaller than that of the front inner surface 188.

A sealing liner is provided, which here comprises a so-called "proximal" sealing gasket 196 and a so-called "distal" sealing gasket 197. The gaskets 196 and 197 are respectively positioned in two inner peripheral grooves formed on the intermediate inner surface 189. These two gaskets 196 and 197 are axially parallel. More generally, the sealing liner comprises a number of parallel sealing gaskets greater than or equal to one, namely at least one sealing gasket 196. As a variant, this sealing liner could be provided on the outer surface of the male body 5, in particular on one of the outer surfaces 88 or 89.

In the unpaired configuration, when the plunger 170 is in the forward position, the front end 171 thereof is at an axial distance d197 from the sealing liner, more specifically, from the proximal sealing gasket 196, or advantageously from the sealing gasket furthest in front of the sealing liner, if a number of gaskets greater than two is provided. For the end 171, the distance d197 is measured on the central axis X111. The front end 171 is in front of the sealing gasket 196.

The front part 107 of the female body 105 houses the locking balls 180, which are movable between an inner radial locking position, shown in FIGS. 5 and 9, in which the locking balls 180 protrude partially in the front volume 115, and an outer radial unlocking position, where the locking balls are retracted outside the front volume 115.

A locking ring 190 surrounds the female body 105. The ring 190 is axially movable between a forward position, shown in FIGS. 5 and 9, in which it keeps the locking balls 180 in the inner radial locking position, and an axially withdrawn position, shown in FIGS. 7 and 8, in which it allows the locking balls 180 to adopt their outer radial unlocking position. A spring 191, inserted between the female body 105 and the locking ring 190, shown schematically, exerts a resilient return force of the locking ring 190 toward the forward position, abutting against a stop segment 192, secured to the female body 105. In the withdrawn position against this spring 191, an inner housing 193 of the locking ring 190 faces the locking balls 180 to allow them to move into the unlocked position, while in the forward position, an inner shoulder 194 of the ring 190, adjacent to the housing 193, keeps the locking balls 180 in the inner radial locking position and prevents the locking balls 180 from adopting the unlocked position.

To go from the unpaired configuration shown in FIGS. 1 and 5, to the paired configuration shown in FIG. 9, the male 1 and female 101 coupling elements are aligned and brought closer together, so that the axes X11 and X111 are coaxial, at least approximately. The locking ring 190 is moved from its forward position to its withdrawn position by the user, against the spring 191, to allow the locking balls 180 to adopt their outer radial unlocked position, such that they do not hinder the fitting of the male body 5 in the female body 105.

As shown by FIG. 7, the male body 5 is inserted into the front volume 115 of the female body 105.

More specifically, the front outer surface 88 is inserted into the female body 105 past the front face 187, and slides axially first in the front inner surface 188, with relatively high radial play, then in the intermediate inner surface 189, with reduced radial play, as shown in FIGS. 7, 8 and 9. When the front outer surface 88 slides in the intermediate inner surface 189, the intermediate outer surface 89 slides in the front inner surface 188 also with reduced radial play. In the paired configuration, the intermediate outer surface 89 is fitted with the front inner surface 188 and the front outer surface 88 is fitted with the intermediate inner surface 189. The axes X11 and X111 are then coaxial. One therefore obtains double guiding, which allows both easy fitting, since the beginning of the fitting is done with relatively high radial play, and precise fitting, since the end of the fitting is done with reduced radial play, over a substantial length of the bodies 5 and 105.

The male body 5 pushes the locking balls 180 back toward their outer radial unlocked position.

During pairing, while the paired configuration has not yet been reached, the sealing is engaged between the male body 5 and the female body 105 by means of the sealing gasket, as shown in FIG. 7. First, this sealing is engaged by the proximal seal 196, which cooperates radially with the female body 105 and with the front outer surface 88 of the male body 5. The front volumes 15 and 115 are then in communication and emerge directly in one another to form an intermediate volume 16 together inside the male 5 and female 105 bodies that is tight with respect to the outside of the coupling. "Tight" means that the sealing liner hinders the fluid communication between the intermediate volume 16 and the outside of the fluid coupling. Outside of the coupling refers to a volume positioned around the male 5 and female 105 bodies by fitting, outside the pipes 3 and 103. As shown in FIG. 7, the intermediate volume 16 is formed and made tight by means of the sealing gasket 196, which is inserted between the intermediate volume 16 and the outside of the coupling, while the safety valves 50 and 150, like the main valves 20 and 120, are still in the closed position. In particular, the plungers 70 and 170 are still in the forward configuration. To that end, it is advantageously provided that the distance d87 is strictly greater than the distance d197, such that the acquisition of tightness between the male body 5 and female body 105 is done before the plungers 70 and 170 push one another away axially.

As shown in FIG. 7, the continuation of the pairing movement causes the axial bearing of the front end 71 of the male plunger 70 with the front end 171 of the female plunger 170. Owing to the mutual geometric cooperation of the surfaces of the ends 71 and 171, which are advantageously conical, the plungers 70 and 170 are guided and self-centered such that the plungers 70 and 170 align themselves relative to one another to avoid jams.

The continued pairing movement causes the plungers 70 and 170 to push one another back, the plunger 70 being pushed back in the direction B11 relative to the body 5 and the plunger 170 being pushed back in the direction B111 relative to the body 105. One of the plungers 70 and 170, then both plungers 70 and 170, respectively reach their intermediate position, thus each coming into contact, via their respective rear end 72 and 172, with their respective safety valve 50 and 150.

One of the two safety valves 50 or 150, for which the fluid in the associated rear chamber 13 or 113 has a lower pressure relative to the fluid in the rear chamber of the other coupling element 1 or 101, is moved first from its respective seat 51 or 151 toward its open position. The secondary passage 40 or 140 of this safety valve 50 or 150 is then open, which causes a circulation of fluid between the rear chamber 13 or 113, associated with the open safety valve 50 or 150, and the intermediate volume 16.

In the present example, the pressure is lower in the rear chamber 113 than in the rear chamber 13, such that the safety valve 150 is moved first toward its open position by the plunger 170, the plunger 170 first crossing the intermediate position, thus entering the withdrawn configuration. As a result, the secondary passage 140 is open, while the secondary passage 40 remains closed at this stage. A fluid communication is therefore open between the rear chamber 113 and the intermediate volume 16 via the secondary passage 140. During the opening of the safety valve 150, only the secondary spring 160 is compressed, and not the main spring 124, while the resilient force developed by the secondary spring 160 is not as high as the resilient force of the main spring 124. The difference in resilient force of the main 124 and secondary 160 springs contributes to guaranteeing that the safety 150 and main 120 valves are placed in the open position sequentially in the desired order.

If a pressurized fluid is present in the rear chamber 113, the pressurized fluid invading the tight intermediate volume 16 coming from the female rear chamber 113, the fluid pressure in the rear chamber 113 is decreased. The pairing continuing, the female plunger 170 continues to withdraw in the female main valve 120 and reaches the withdrawn position, i.e., abutting rearwardly against the main valve 120. During this phase, the rear face of the male plunger 70 is still in contact with the male safety valve 50, which is in the closed position.

The pairing movement next causes the opening of the male safety valve 50, driven by the male plunger 70, which withdraws in the main valve 20 past its intermediate position, i.e., the plunger 70 enters the withdrawn configuration. This results in opening a fluid communication between the rear chamber 13 and the intermediate volume 16, through the secondary passage 40 in the male main valve 20, allowing the decrease of the fluid pressure in the rear chamber 13. This situation is illustrated in FIG. 8. Since the passage 140 is open, and if the rear chamber 113 is connected to a large volume at low pressure, the fluid that escapes from the rear chamber 13 can also benefit from the volume connected to the female rear chamber 113 to decrease in pressure relative to the initial pressure in the rear chamber 13 in the unpaired configuration. The fluid can then circulate as shown by the arrows L in FIG. 8. Then the male plunger 70 reaches the withdrawn position of the withdrawn configuration, i.e., abutting rearwardly against the male main valve 20.

When the plungers 70 and 170 are both in the withdrawn position, they keep the safety valves 50 in the open position, since they are both in the withdrawn configuration. Since the plungers 70 and 170 each protrude toward the front of their respective main valve 20 and 120, the front faces of the main valves 20 and 120, in particular the front ends 31 and 131, remain distant from one another. Thus, before the opening of the main valve 20, 120, the respective secondary passage 40, 140 is necessarily open between the rear chamber 13, 113 and the intermediate volume 16 formed by the front volumes 15 and 115. In particular, the fluid can circulate around each plunger 70 and 170 and around each safety valve 50 and 150, through the main valves 20 and 120. In particular, transverse slots 83, visible in FIG. 4, are provided on the stop surface 74 of the intermediate body 25, to facilitate this circulation of fluid through the open secondary passage 40 when the male plunger 70 is in the withdrawn position. Transverse slots not visible in the figures are formed on the stop surface 174 for the same effect applied to the open secondary passage 140 when the female plunger 170 is in the withdrawn position. The pressure in the chambers 13 and 113 being lowered, the axial force necessary to continue bringing the male 1 and female 101 coupling elements closer together for pairing and to open the main valves 20 and 120 is reduced. Indeed, the pressure of the fluid in the chambers 13 and 113 being decreased, the maintaining force of the main valves 20 and 120 in the closed position by the pressure of the fluid is also decreased. However, if, when the plungers reach the withdrawn position, the speed of the pairing movement of the coupling element 1 toward the coupling element 101 has been too fast and has not made it possible to decrease the pressure sufficiently in the rear chambers 13 and 113, the pairing force to be supplied remains too high and the approach of the bodies 5 and 105 can be difficult to continue. The pressurized fluid can, however, continue to spill into the intermediate volume 16, and into the rear chamber 13 or 113 of lower pressure, via the secondary passages 40 and 140 that are not obstructed, until the pairing force becomes surmountable and the fitting continues by withdrawal of the main valves 20 and 120.

At the stage of FIG. 8, the fluid pressures having decreased in the rear chambers 13 and 113, it is now possible to push the main valves 20 and 120 back toward their respective open positions. The main valve 20 or 120, recalled by the main spring 24 or 124 with the weakest stiffener, is opened first. Then, the circulation of fluid is allowed between this main valve 20 or 120 and the associated body 5 or 105, by the main passage 30 or 130 opened first.

In the present example, the male main valve 20 is pushed back first into the open position, i.e., before the female main valve 120. In the movement of the main valve 20, only the main spring 24 must be compressed. The front of the male body 5 comes into contact with the distal gasket 197, which provides reinforced sealing. As long as the return force of the male main valve 20 exerted by the main spring 24 is lower than the return force of the female main valve 120 exerted by the main spring 124, the male main valve 20 is the only one that is open. Next, the main valve 120 is open, in practice, either from a certain compression of the main spring 24 causing the resilient return force of the springs to reach the same value, or when the front face 87 of the male body bears axially against the front extension 136 of the female main valve 120. In the latter case, the two main valves 20 and 120 are then moved simultaneously toward their open position, as shown in FIG. 9.

The paired configuration is reached at least when the front volume 115 receives the body of the male coupling element by fitting, tightly owing to its sealing liner, and the main valves 20 and 120 are both in the open position.

In the intermediate position of the plungers, in the withdrawn position of the plungers, and in the paired configuration of the coupling, the proximal shoulder 82, 182 remains axially distant from the front end 31, 131 of the respective main valve 20, 120.

During pairing, when the male main valve 20 is pushed back toward its open position, its rear body 23 retracts inside the skirt 35 of the rear part 28.

For each coupling element 1 and 101, in the open position of the safety valve 50 or 150, the passage section of the associated secondary passage 40 or 140 is preferably much smaller than the passage section of the associated main passage 30 or 130, obtained in the open position of the associated main valve 20 or 120. The circulation of fluid between the rear chambers 13 and 113 is therefore preferably done through the main passages.

At the end of pairing, the front face 187 of the female body 105 abuts axially against a shoulder of the male body 5.

The locking balls 180 then arrive opposite the outer peripheral groove 80 of the male body 5 and engage therein, in the inner radial locking position of the locking balls 180. This is preferably obtained by releasing the ring 190, which regains its forward position under the action of the spring 191, this movement of the ring 190 also driving the locking balls 180 in their inner radial movement. The locking balls 180 being engaged in the outer peripheral groove 80, they then oppose a removal of the male body 5 from the female body 105, i.e., an axial movement of the coupling elements 1 and 101 away from one another. Depending on the geometry of the locking groove, a slight withdrawal of the male body relative to the female body can take place before blocking of the male body 5 by the locking balls 180, as illustrated in FIG. 9. Preferably, the paired configuration of the two coupling elements is reached when the locking of the locking balls 180 in the outer peripheral groove 80 is done, in addition to the fact that the open position of the main valves 20 and 120 is obtained.

To go from the paired configuration shown in FIG. 9, to the unpaired configuration shown in FIGS. 1 and 5, the locking ring 190 is first moved from its forward position to its withdrawn position by the user, to allow the locking balls 180 to adopt their outer radial unlocked position.

The male body 105 can then be separated from the male body 5, i.e., the body 5 is moved in the direction B11 while the female body is moved in the direction B111, the locking balls 180 not opposing this withdrawal of the male body 5 from the female body 105.

The withdrawal of the male body 5 is followed by the closing of one of the main valves 20 or 120. The main valve 20 or 120 moved first toward the closed position is that which is subject to the strongest resilient return by its respective main spring 24 or 124. In this example, it is the main valve 20. At this moment, the plungers 70 and 170 remain in axial contact against one another in the withdrawn configuration. The valves 50 and 150 therefore both remain in the open position.

One then returns to the configuration of FIG. 8 described above. In this configuration, the two main valves 20 and 120 are in the closed position, but the safety valves 50 and 150 are still kept in the open position by the plungers 70 and 170. Under the effect of the relative separating movement of the bodies 5 and 105, the safety valves 50 and 150 successively close. The plungers 70 and 170 have been respectively pushed back by the safety valves 50 and 150 in the intermediate position. One obtains the configuration shown in FIG. 7 and described above.

At least during all of the aforementioned steps for unpairing the coupling elements 1 and 101, the intermediate volume 16 formed by the front volumes 15 and 115 is still tight, owing to the sealing liner including the sealing gasket 196. Thus, the intermediate volume 16 is tight when the secondary passages 40 and 140 are closed by the safety valves 50 and 150.

By continuing the mutual separating movement of the bodies 5 and 105, the plungers 70 and 170 leave their mutual contact.

The male body 5 ends up losing tightness with the female body 105 at the proximal gasket 196. The male body 5 is withdrawn outside the female body 105, as shown in FIGS. 1 and 5 described above. In this unpaired configuration, all of the valves 20, 120, 50 and 150 are in the closed position and the plungers 70 and 170 are not in contact.

Ultimately, owing to the preceding arrangements, the coupling of FIGS. 1 to 9 has many advantages.

In particular, in all of the configurations of the coupling, the placement of the safety valves 50 and 150 in the open position can only occur if the intermediate volume 16 is made tight with respect to the outside of the coupling, with no leak into the environment. This is in particular obtained owing to the arrangement of the sealing liner and plungers in the male and female bodies. The plungers 70 and 170 are respectively formed by separate parts with respect to the valves 50 and 150, and the plungers 70 and 170 bear against the valves 50 and 150 only at certain moments of the pairing and unpairing, which limits leaks. Additionally, a monobloc plunger-safety valve is less tolerant to manufacturing defects and more subject to jams in the main valve, which could lead to leaks into the environment of the coupling.

In particular, during pairing, when the plunger 70 or 170, or the safety valve 50 or 150, pushes the respective main valve 20 or 120 back into the open position, one guarantees that the opening of the safety valve 50, 150 is done before the opening of the respective main valve 20 or 120, to guarantee the pressure drop and therefore the decrease in the pairing force. During unpairing, the reverse sequence is obtained.

During pairing, for the opening of the safety valves 50 and 150, at high pressure, it is necessary to push the safety valves 50 and 150 back, over a sealing section, defined by the diameters of the gaskets 51, 151, much smaller than the sealing section of the main passages 30 and 130, defined by the diameters of the gaskets 26, 126. Preferably, for each coupling element 1 and 101, the ratio between the sealing section of the main passage and the secondary passage is greater than four.

Next, when the plunger 70 or 170 pushes the respective main valve 20 or 120 back, it is only necessary for the main spring 24 or 124 to be more compressed, while the secondary spring 60 or 160 is already compressed. The pairing forces are therefore minimized.

Since the front faces of the main valves 20 and 120 do not come into contact, in any configuration of the coupling, since one has further advantageously arranged the emerging radial parts 43 and 143 of the secondary passages 40 and 140, and since the plungers 70 and 170 do not obstruct the secondary passages 40 and 140, even in particular in the intermediate position or in the withdrawn configuration, the secondary passages 40 and 140 remain clear to continue the pressure decrease irrespective of the speed of the pairing movement.

The main springs 24 and 124 are protected from the fluid stream in the paired configuration, which increases their lifetime, in particular respectively by the rear part 28 and by the front extension 136.

The engagement of the male body 5 in the female body 105 is done by a double guiding, owing to the pair of outer surfaces 88 and 89 and the pair of inner surfaces 188 and 189. The fitting of the bodies 5 and 105 is therefore done without jamming and with an optimal alignment between the plungers 70 and 170.

In the paired configuration, the male body 5 is in contact, by its front wall 87, against the front extension 136, which axially blocks any forward movement of the female main valve 120, under the effect of the flow rate in the paired configuration.

The large length of the plunger 70 and/or 170, i.e., more than 2 times the inner diameter of the respective pipe 11 or 111, ensures that the tight intermediate volume 16 is a relatively large volume, to allow rapid pressure decrease of the rear chamber(s) 13 and/or 113 during the pairing.

The coupling can be used for high pressures present in the rear chamber of one or the other coupling element, or in the rear chamber of both coupling elements, since each of the two coupling elements is equipped with a respective plunger 70 or 170 and a respective safety valve 50 or 150.

Figure 10:
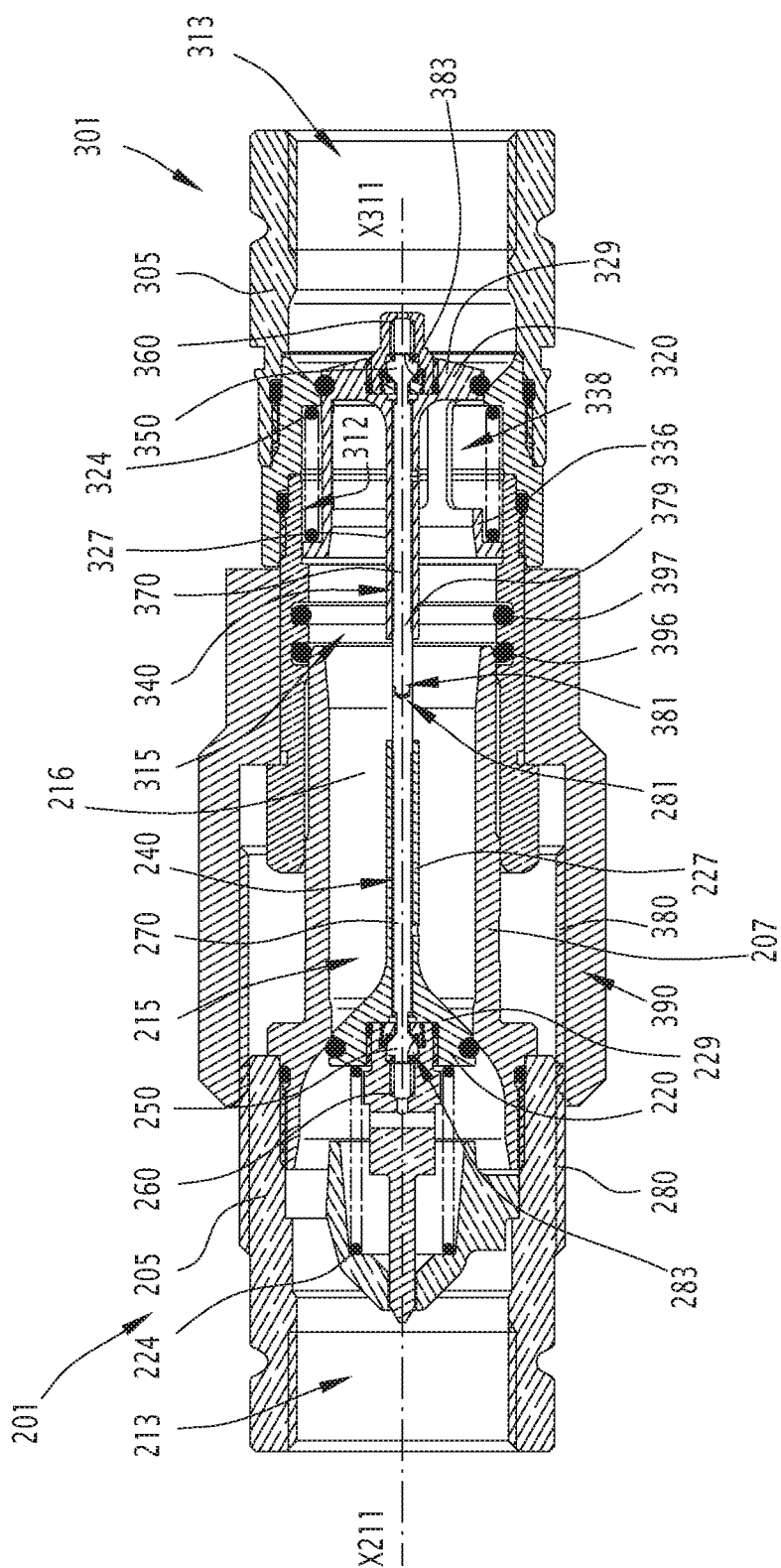
FIGS. 10 and 11 are longitudinal sectional views, in a same plane, of a fluid coupling according to a second embodiment according to the invention, showing the fluid coupling in two different configurations.
Figure 11:
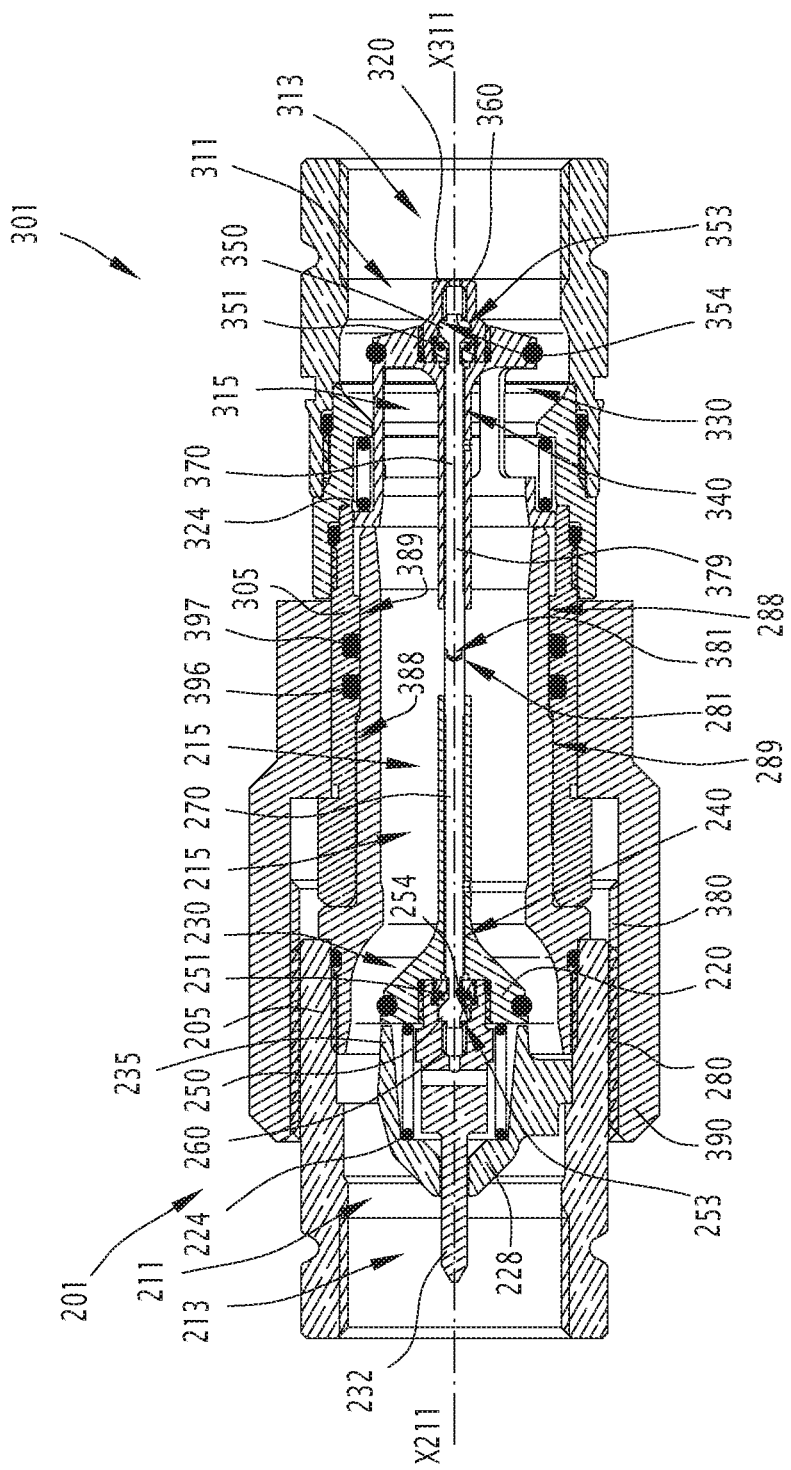

For the second embodiment of a coupling according to the invention illustrated in FIGS. 10 and 11, many elements, designated with identical references increased by 200, identical names in the present description and a similar outline in the drawings, have shared functions, or even structures and geometries, with the corresponding elements of the embodiment of FIGS. 1 to 9. These shared elements are not described in detail, aside from their differences with respect to those of the embodiment of FIGS. 1 to 9. More generally, the main differences between the two embodiments are described below. All or some of the differences described below can be implemented in the embodiment of FIGS. 1 to 9.

Like in the case of FIGS. 1 to 9, the coupling of FIGS. 10 and 11 comprises a male coupling element 201 and a female coupling element 301. The coupling element 201 comprises a body 205, defining an inner pipe 211 along a longitudinal central axis X211, comprising a front volume 215 and a rear chamber 213 that are inside the body 205. The coupling element 201 comprises a main valve 220, whereof a closing part 229 selectively closes off a main passage 230 for the fluid, which is recalled by a main spring 224 into a closing position. The main valve 220 also comprises a front rod 227. The coupling element 201 comprises a plunger 270 and a safety valve 250, which selectively closes off a secondary passage 240 through the main valve 220, and which is recalled by a secondary spring 260 into the closed position. Likewise, the coupling element 301 comprises a body 305, defining an inner pipe 311 along a longitudinal central axis X311, comprising a front volume 315 and a rear chamber 313 that are inside the body 305. The coupling element 301 comprises a main valve 320, whereof a closing part 329 selectively closes off a main passage 330 for the fluid, and which is recalled by a main spring 324 into a closing position. The main valve 320 also comprises a front rod 327. The coupling element 301 comprises a plunger 370 and a safety valve 350, which selectively closes off a secondary passage 340 through the main valve 320, and which is recalled by a secondary spring 360 into the closed position. A sealing liner, here comprising two sealing gaskets 396 and 397, is arranged so as to be inserted between the body 305 and the body 205 to ensure the sealing of the intermediate volume 216 formed by the placement in direct fluid communication of the front volumes 215 and 315, not only in the paired configuration of the coupling of FIGS. 10 and 11, but also during pairing, to ensure the sealing of the intermediate volume 216 before one of the valves 220, 320, 250 or 350 is in the open position.

To replace the outer peripheral groove 80, the locking balls 180 and the ring 190, the body 205 of the male coupling element 201 includes an outer thread 280 and the female coupling element 301 comprises a ring 390 with an inner thread 380. The ring 390 is mounted, while being axially pivoting, around the female body 305, its thread 380 being able to be screwed with the thread 280 of the male body 205, as shown in FIGS. 10 and 11. More generally, to be placed in the paired configuration, the two coupling elements 201 and 301 are screwed in one another.

Still more generally, it is provided that, for the two embodiments, the coupling comprises locking means in the paired configuration, for example in one case the elements 80, 180 and 190, for example in the other case, the elements 280, 380 and 390.

The safety valve 250 and the plunger 270 are monobloc, therefore axially secured, and the safety valve 350 and the plunger 370 are monobloc, therefore axially secured, instead of being formed by separate parts that are axially movable relative to one another like for FIGS. 1 to 9. These two plungers-safety valves have a general geometry of revolution. According to the embodiment of FIGS. 10 and 11, the plungers 270 and 370 are respectively connected in the axial position with the safety valves 250 and 350, in the forward configuration and in the withdrawn configuration. In other words, each plunger-safety valve moves, in one piece, between the withdrawn position of the plunger, in which the safety valve is in the open position, and the forward position, which is the closed position of the safety valve. In the withdrawn configuration, each plunger 270, 370 thus moves the respective safety valve 250, 350 into the open position.

For FIGS. 10 and 11, the intermediate position of each plunger 270 and 370 is combined with the forward position. Each plunger 270 and 370 is in the forward configuration only in the forward position, which is also the intermediate position, and in the withdrawn configuration for all of the other positions between the forward/intermediate position (not inclusive) and the withdrawn position. As shown in FIG. 10, in the forward position of the plunger-valve, the plunger-valve is forwardly abutting, by means of the associated safety valve 250 or 350, against the associated main valve 220 or 320. To that end, each safety valve 250 and 350 for example comprises a respective shoulder 253 and 353. These shoulders 253 and 353 respectively comprise, for example, a front face with a hemispherical or frustoconical geometry, facing forward, which bears against the respective inner seat 251 and 351 of the main valves 220 and 320.

As shown in FIG. 11, for each coupling element 201 and 301, in the withdrawn position of the plunger-valve, the plunger-valve 270, 370 is rearwardly abutting, by means of the associated safety valve 250 or 350, against the associated main valve 220 or 320. To that end, for example, each of the shoulders 253 and 353 comprises a rear face, facing the back of the respective coupling element 201, 301, that abuts against a respective inner axial wall 254, 354, facing the front of the respective coupling element 201, 301 of the associated main valve 220 or 320. Each inner axial wall 254 and 354 is placed behind the respective inner seat 251 and 351 of the associated main valve 220 and 320. To prevent the plungers 270 and 370 from respectively closing off the secondary passages 240 or 340 in the withdrawn position, each rear shoulder 253 and 353 is advantageously axially passed through by at least one longitudinal slot 283, respectively 383, that does not, however, allow the rear chamber 213, 313 to communicate with the front volume 215, 315, when the safety valve 250, 350 is in the closed position.

The front end surface 281 of the plunger 270 forms a cylindro-conical cavity, i.e., cylindrical in the front and conical in the rear, the cylindro-conical cavity being open in the front direction of the coupling element 201. The front end surface 381 of the plunger 370 forms a cylindro-conical centering protrusion, i.e., conical toward the front, and cylindrical toward the rear. The centering protrusion has a smaller diameter compared to the front part 379 of the plunger 370. When they are placed in axial contact, the two plungers 270 and 370 are centered by cooperation of the centering protrusion and the cylindro-conical cavity.

During pairing, a front part 207 of the male body 205 is introduced into the front volume 315. Next, the tightness is acquired between the male body 205 and the female body 305, at least via the gasket 396, then the plungers 270, 370 come into axial contact, then the safety valve 250 or 350 subject to the lower fluid pressure force, from its respective rear chamber 213 or 313, is moved toward the open position by its plunger. Contrary to the embodiment of FIGS. 1 to 9, in the embodiment of FIGS. 10 and 11, once the plungers 270 and 370 are centered and reach axial abutment, one of the safety valves 250 and 350 is moved toward its open position. Once it is withdrawn, the plunger 270 or 370 is in the withdrawn configuration. Next, the other safety valve is moved toward the open position.

The safety valves 250 and 350 respectively being pushed back, in the open position, to abut rearwardly against the main valves 220 and 320, the main valves 220 and 320 are next driven toward their open position to reach the paired configuration.

The main valve 22 comprises a rear rod 232, guided radially in a rear part 228 secured to the body 205, the rear part 228 comprising a skirt 235. The main valve 320 comprises a front extension 336, with openings 338, an inner radial surface 312 radially guiding the front extension 336.

The body 205 comprises a front outer surface 288 and an intermediate outer surface 289, while the body 305 comprises a front inner surface 388 and an intermediate inner surface 389.

According to other variants that are not illustrated, the features of which can modify one or another of the illustrated embodiments described above:

The safety valve has the cylindrical geometry of the embodiment of FIGS. 10 and 11, while forming a separate part with respect to the plunger, like in FIGS. 1 to 9.

During pairing, the plunger of the coupling element can push the main valve of the coupling element back, while the body of the coupling element abuts against a front extension of the main valve of the complementary coupling element, to push the main valve of the complementary coupling element back into the open position. In other words, the plunger of the complementary coupling element, according to this variant, does not push back the main valve of the complementary coupling element toward its open position.

The locking means of the coupling in the paired configuration comprise a bayonet system, or any other locking member such as fingers or locking segments.

During pairing, the safety valve, separate from the plunger and moved by the plunger toward its open position, abuts rearwardly against the main valve. The plunger then pushes the main valve back toward its open position by means of the safety valve.

During pairing, the first safety valve of the coupling element whereof the rear chamber is at a lower pressure is moved toward its open position. If the pressure in the other rear chamber is very high, it is possible for the main valve associated with the first safety valve to be opened before the opening of the second safety valve.

The invention claimed is:

1. A fluid coupling, comprising a male coupling element and a female coupling element, each coupling element respectively comprising:
    a body, defining, along a longitudinal central axis, an inner pipe comprising a front volume, emerging at the front of the body, and a rear chamber,
    a main valve, movable in the body between an open position, in which a main passage is open between the main valve and the body, for the passage of the fluid between the rear chamber and the front volume, and a closed position, in which a closing part of the main valve is abutting forwardly against the body and closes the main passage,
    a main spring, which returns the main valve toward its closed position,
    a safety valve, movable relative to the main valve between a closed position and an open position of a secondary passage, arranged through the main valve, between the rear chamber and the front volume,
    a secondary spring, which bears on the safety valve and on the main valve and which returns the safety valve toward its closed position abutting forwardly against the main valve, and
    a plunger, movable in the main valve between a forward configuration, in which the safety valve is in the closed position, and a retracted configuration, in which the plunger moves the safety valve into the open position,
the fluid coupling being configured to move between:
    an unpaired configuration, in which the bodies of the male and female coupling elements are separated from one another and the main and safety valves of the two coupling elements are in the closed position, and
    a paired configuration, in which the front volume of the female coupling element receives a front part of the body of the male coupling element by fitting and the main valves are in the open position;
one from among the male coupling element and the female coupling element comprises at least one sealing gasket that cooperates with the body of the female coupling element and with the body of the male coupling element in the paired configuration,
during a passage from the unpaired configuration to the paired configuration, the plungers come axially into contact against one another and each plunger moves the associated safety valve into the open position, while the associated main valve is in the closed position,
wherein the fluid coupling is configured so that, during a passage from the unpaired configuration to the paired configuration:
    said at least one sealing gasket cooperates with the body of the female coupling element and with the body of the male coupling element, before the safety valves of the two coupling elements are moved toward their open position, and
    for at least one of the coupling elements, the plunger pushes the associated main valve back toward its open position, once the associated safety valve is in the open position.

2. The coupling according to claim 1, wherein, for at least one of the coupling elements:
    the main valve comprises a forward extension, passed through by openings for the passage of fluid at the main passage in the open position of said main valve, and
    the body of said coupling element comprises an inner radial surface radially guiding the forward extension in said body.

3. The fluid coupling according to claim 2, wherein the main spring of the coupling element that comprises the forward extension is positioned radially between the body of said coupling element and the forward extension.

4. The fluid coupling according to claim 2, wherein:
the forward extension is formed in the female coupling and
the forward extension is in contact with the front part of the body of the male coupling element in the paired configuration.

5. The fluid coupling according to claim 1, wherein, during a passage from the unpaired configuration to the paired configuration, the plunger of each coupling element abuts rearwardly against the associated main valve, and thus pushes the associated main valve back toward its open position.

6. The fluid coupling according to claim 1, wherein, for at least one of the coupling elements, the secondary passage is open between the rear chamber and the front volume for any axial position of the plunger of said coupling element relative to the associated main valve when said plunger is in the withdrawn configuration.

7. The fluid coupling according to claim 1, wherein, for each of the two coupling elements, the plunger protrudes toward the front of the associated main valve, irrespective of the axial position of said plunger relative to said main valve.

8. The fluid coupling according to claim 1, wherein, for at least one of the coupling elements, the plunger is axially movable relative to the associated safety valve.

9. The fluid coupling according to claim 8, wherein at least one ball, housed both in a longitudinal slot of the main valve and in a peripheral groove of the plunger, forms a front stop of the plunger against the main valve in the forward configuration of the plunger.

10. The fluid coupling according to claim 1, wherein, for at least one of the coupling elements, the plunger and the safety valve are axially secured.

11. The fluid coupling according to claim 1, wherein each plunger comprises a front end surface, the front end surfaces of the two plungers having a complementary shape and being configured to cooperate with one another, when the plungers are placed in contact against one another during the passage from the unpaired configuration to the paired configuration.

12. The fluid coupling according to claim 11, wherein one of the front end surfaces is convex and has a conical shape centered on the central longitudinal axis of the coupling element to which said front end surface belongs, while the other front end surface is concave and has a complementary conical shape, centered on the central longitudinal axis of the other coupling element.

13. The fluid coupling according to claim 1, wherein, for at least one of the coupling elements:
the main valve comprises a front rod, extending in front of the closing part and housing the plunger, the front rod having a smaller diameter compared to the closing part; and
the length of said plunger is greater than twice the inner diameter of the front volume of said coupling element.

14. The fluid coupling according to claim 1, wherein, for at least one of the coupling elements:
the coupling element comprises a rear part, secured to the body, and comprising a skirt,
the main spring of said coupling element bears on the rear part and on the main valve of said coupling element,
said main valve comprises a rear rod that extends behind the closing part and that is guided radially in the rear part, and
the skirt of the rear part is radially inserted between said main spring and the fluid circulating in the rear part of said coupling element in the paired configuration.

15. The fluid coupling according to claim 1, wherein:
the body of the male coupling element comprises a cylindrical front outer surface and a cylindrical intermediate outer surface, the intermediate outer surface being offset toward the rear relative to the front outer surface and having a diameter larger than the diameter of the front outer surface;
the body of the female coupling element comprises a cylindrical front inner surface and a cylindrical intermediate inner surface, which delimit part of the front volume of the female coupling element, the intermediate inner surface being offset toward the rear relative to the front inner surface and having a diameter smaller than the diameter of the front inner surface; and
in the paired configuration, the intermediate outer surface is fitted with the front inner surface and the front outer surface is fitted with the intermediate inner surface.

* * * * *